US010471590B1

(12) United States Patent
Vachon

(10) Patent No.: US 10,471,590 B1
(45) Date of Patent: Nov. 12, 2019

(54) CABLE ROBOT

(71) Applicant: Frédéric Vachon, Saint-Bruno-de-Montarville (CA)

(72) Inventor: Frédéric Vachon, Saint-Bruno-de-Montarville (CA)

(*) Notice: Subject to any disclaimer, the term of this patent is extended or adjusted under 35 U.S.C. 154(b) by 0 days.

(21) Appl. No.: 16/378,734

(22) Filed: Apr. 9, 2019

Related U.S. Application Data

(60) Provisional application No. 62/830,783, filed on Apr. 8, 2019.

(51) Int. Cl.
| | |
|---|---|
| *B25J 9/00* | (2006.01) |
| *B25J 9/10* | (2006.01) |
| *B25J 13/08* | (2006.01) |
| *B25J 9/16* | (2006.01) |

(52) U.S. Cl.
CPC .............. *B25J 9/104* (2013.01); *B25J 9/1697* (2013.01); *B25J 13/08* (2013.01)

(58) Field of Classification Search
USPC ................................................ 700/245–264
See application file for complete search history.

(56) References Cited

U.S. PATENT DOCUMENTS

| | | | | |
|---|---|---|---|---|
| 4,625,938 A | * | 12/1986 | Brown | F16M 11/18 248/550 |
| 4,710,819 A | | 12/1987 | Brown | |
| 5,113,768 A | * | 5/1992 | Brown | B61B 7/02 104/112 |
| 5,224,426 A | * | 7/1993 | Rodnunsky | B61B 7/00 104/112 |
| 5,313,854 A | | 5/1994 | Akeel | |
| 5,408,407 A | | 4/1995 | Lefkowitz | |
| 5,440,476 A | * | 8/1995 | Lefkowitz | G05B 19/251 212/76 |
| 5,568,189 A | * | 10/1996 | Kneller | H04N 5/222 248/58 |
| 5,585,707 A | * | 12/1996 | Thompson | B25J 5/00 318/568.1 |
| 6,566,834 B1 | * | 5/2003 | Albus | B25J 9/1623 318/566 |
| 6,809,495 B2 | * | 10/2004 | Rodnunsky | B66C 13/08 104/180 |
| 6,826,452 B1 | * | 11/2004 | Holland | B66C 1/663 318/566 |

(Continued)

FOREIGN PATENT DOCUMENTS

| | | |
|---|---|---|
| DE | 102008013729 A1 | 9/2009 |
| EP | 0246922 A2 | 5/1987 |

(Continued)

OTHER PUBLICATIONS

Applications and Theoretical Issues of Cable-Driven Robots, Melissa Morris et al., 22nd Florida Conference, May 21-22, 2009.

(Continued)

*Primary Examiner* — Jonathan L Sample
(74) *Attorney, Agent, or Firm* — Anglehart et al.

(57) ABSTRACT

A suspension cable robot is provided, its stability can be improved by using at least three groups of three cables arranged in a parallelogram manner. The ability to remain stable when subjected to forces acting on the robot platform or end effector is thereby significantly increased.

16 Claims, 22 Drawing Sheets

(56) References Cited

U.S. PATENT DOCUMENTS

| | | | | |
|---|---|---|---|---|
| 7,088,071 | B2* | 8/2006 | Rodnunsky | F16M 11/045 |
| | | | | 104/180 |
| 7,151,848 | B1* | 12/2006 | Watanabe | B25J 9/1656 |
| | | | | 382/141 |
| 7,753,642 | B2* | 7/2010 | Bosscher | B25J 17/0266 |
| | | | | 414/735 |
| 8,199,197 | B2* | 6/2012 | Bennett | F16M 11/105 |
| | | | | 348/144 |
| 8,418,662 | B2* | 4/2013 | Kim | F22B 37/003 |
| | | | | 122/363 |
| 9,063,390 | B2* | 6/2015 | Wharton | G03B 15/00 |
| 9,308,652 | B2* | 4/2016 | Pehlivan | B25J 17/0266 |
| 9,337,949 | B2* | 5/2016 | Wharton | H04J 14/02 |
| 9,477,141 | B2* | 10/2016 | Wharton | H04N 5/2251 |
| 2002/0041794 | A1* | 4/2002 | Bostelman | B63C 5/02 |
| | | | | 405/4 |
| 2004/0124803 | A1* | 7/2004 | Rodnunsky | B66C 13/08 |
| | | | | 318/649 |
| 2009/0066100 | A1* | 3/2009 | Bosscher | B25J 17/0266 |
| | | | | 294/86.4 |
| 2009/0103909 | A1* | 4/2009 | Giegerich | F16M 11/18 |
| | | | | 396/12 |
| 2009/0207250 | A1* | 8/2009 | Bennett | F16M 11/105 |
| | | | | 348/144 |
| 2013/0164107 | A1* | 6/2013 | Pehlivan | B25J 17/0266 |
| | | | | 414/732 |
| 2013/0321613 | A1* | 12/2013 | Hansen | H04N 7/18 |
| | | | | 348/84 |
| 2013/0345876 | A1* | 12/2013 | Rudakevych | B25J 9/1697 |
| | | | | 700/259 |
| 2015/0062328 | A1* | 3/2015 | Lauffer | G06T 7/0004 |
| | | | | 348/125 |
| 2016/0023761 | A1* | 1/2016 | McNally | B64C 39/024 |
| | | | | 29/407.01 |
| 2017/0027803 | A1* | 2/2017 | Agrawal | A61B 5/6828 |
| 2018/0111265 | A1* | 4/2018 | DelSpina | B25J 9/161 |
| 2019/0098221 | A1* | 3/2019 | Troy | H04N 5/23296 |

FOREIGN PATENT DOCUMENTS

| | | |
|---|---|---|
| EP | 1967784 A2 | 9/2008 |
| WO | WO 95/23053 A1 | 8/1995 |
| WO | WO 01/77571 A1 | 10/2001 |
| WO | WO 2005/013195 A2 | 2/2005 |
| WO | WO 2005/042385 A2 | 5/2005 |
| WO | WO 2014/057028 A1 | 4/2014 |
| WO | WO 2018/087101 A1 | 5/2018 |

OTHER PUBLICATIONS

Book, Cable-Driven Parallel Robots: Proceedings of the Second International Conference on Cable-Driven Parallel Robots, Andreas Pott, Tobias Bruckmann, Aug. 18, 2014, abstract.

Book, Cable-Driven Parallel Robots: Proceedings of the Third International Conference on Cable-Driven Parallel Robots (Mechanisms and Machine Science Book 53), 1st ed., Clément Gosselin, Philippe Cardou, Tobias Bruckmann, Andreas Pott, 2018 Edition, abstract, Dinh-Son Vu@page319.

Book, Cable-Driven Parallel Robots: Theory and Application, Andreas Pott, Mar. 28, 2018, abstract.

Book, Design, Analysis and Control of Cable-Suspended Parallel Robots and Its Applications, 1st ed., Bin Zi, Sen Qian, 2017 Edition, abstract.

Cable Robot Performance Evaluation by Wrench Exertion Capability, Giovanni Boschetti and Alberto Trevisani; Robotics 2018, 7(2), 15: Mar. 27, 2018.

Cable-Driven Parallel Robot with Reconfigurable End Effector Controlled with a Compliant Actuator, Alejandro Rodriguez-Barroso et al., Sensors 2018, 18(9), 2765, Aug. 22, 2018.

Computing cross-sections of the workspace of cable-driven parallel robots with 6 sagging cables, Jean-Pierre Merlet, Computational Kinematics pp. 182-189, May 2017.

Design and Programming for Cable-Driven Parallel Robots in the German Pavilion at the EXPO 2015; Philipp Tempel et al., Machines 2015, 3(3), 223-241, Aug. 25, 2015.

Eric Barnett et al., Large-Scale 3D Printing With a Cable-Suspended Robot, 2015, https://www.researchgate.net/publication/277727862_Large-Scale_3D_Printing_With_A_Cable-Suspended_Robot.

Geometric Parameter Calibration for a Cable-Driven Parallel Robot Based on a Single One-Dimensional Laser Distance Sensor Measurement and Experimental Modeling, XueJun Jin et al., Sensors 2018, 18(7), 2392; Jul. 23, 2018.

Kinematic Analysis of Planar Parallel Mechanisms Actuated with Cables, Clément M. Gosselin et al., www.researchgate.net/publication/238255376, Sep. 22, 2014.

Optimal Design of Cable-Driven Parallel Robots for Large Industrial Structures, Lorenzo Gaglardini et al., Proceedings—IEEE International Conference on Robotics and Automation • May 2014.

Optimal Design of Dexterous Cable Driven Parallel Manipulators, Mohammad M. Arefa et al.,International Journal of Robotics, vol. 1, No. 1 (2009) Dec. 2, 2009.

Seven-DOF Cable-Suspended Robot With Independent Metrology, Robert L. Williams II et al., Engineering Conference, Salt Lake City, UT Sep. 28-Oct. 2, 2004.

Summary of Modeling and Simulation for NIST RoboCrane® Applications, Edward Amatucci et al., Deneb International Simulation Conference and Technology Showcase, Detroit, MI, Sep. 29-Oct. 3, 1997.

Towards vision-based control of cable-driven parallel robots, Tej Daliej et al., IEEE/RSJ International Conference on Intelligent Robots and Systems, pp. 2855-2860, Apr. 26, 2012.

* cited by examiner

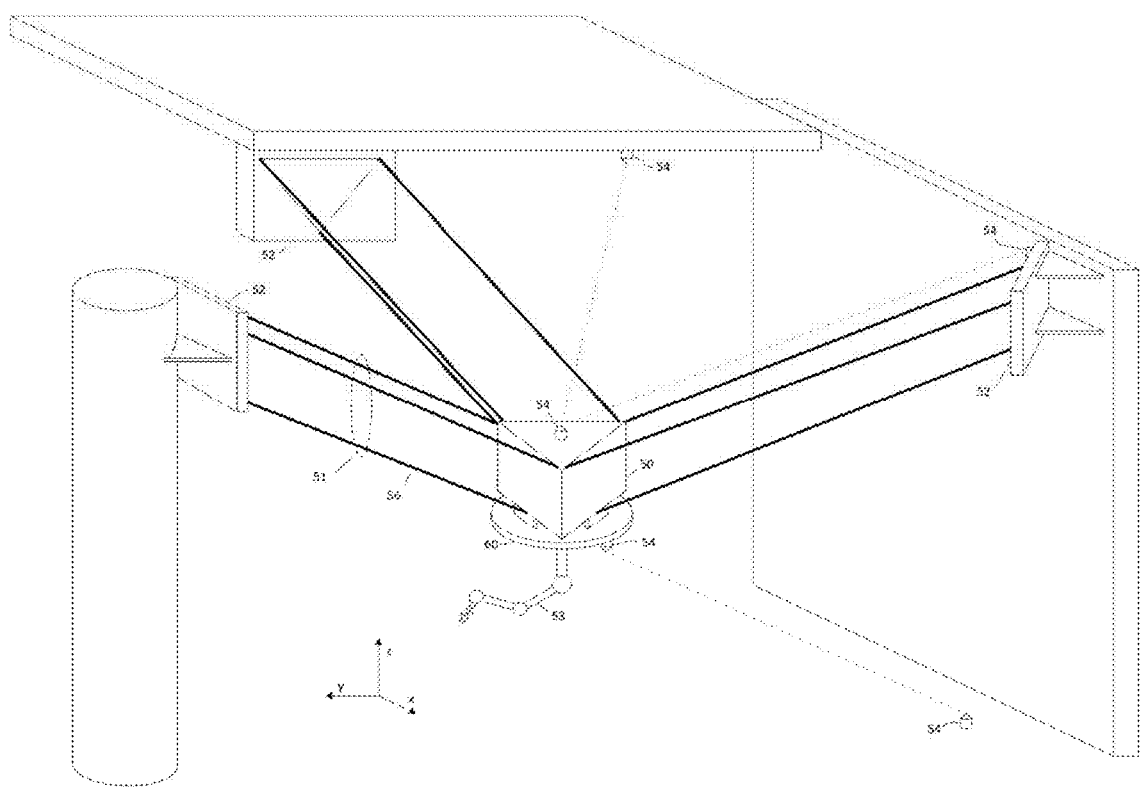

CABLE ROBOT

This application claims priority from U.S. provisional patent application 62/830,783 filed Apr. 8, 2019, the specification of which is hereby incorporated by reference.

FIELD OF THE INVENTION

The present patent application relates to the field of cable robots.

BACKGROUND

Ceiling-mounted robots are also known in the art, as for example from German patent publication 102008 013 729, published on 17 Sep. 2009. The objective is to allow the robotic arm to access and work within a large range while allowing mobility in the free space above objects within the work area.

Cable robots have been proposed in the academic and patent literature but are not in widespread use in industry. A cable robot is a robot or robotic platform that is held in space using cables so that the robot can be moved throughout a relatively large space or volume in comparison with articulated arm robots. To provide stability, most cable robot systems have cables that support the weight of the robotic platform from above as well as cables that stabilize the platform from below. An example is described in U.S. Pat. No. 7,753,642. While the stability can be satisfactory, the encumbrance of the lower stabilizing cables defeats the advantages of the mobility of a cable robot.

Cable robots that are suspended from cables only are also known in the paper titled "On the Design of a Three-DOF Cable-Suspended Parallel Robot Based on a Parallelogram Arrangement of the Cables" by Dinh-Son Vu, Eric Barnett, Anne-Marie Zaccarin, and Clément Gosselin and published in Springer International Publishing AG 2018 (C. Gosselin et al. (eds.), Cable-Driven Parallel Robots, Mechanisms and Machine Science 53), a cable robot is described to use 3 pairs of cables configured as parallelograms to have the capability of moving in a 3D environment maintaining a constant orientation of the central module from a top view (z axis). The main motivation of the work is to reduce the number of actuators needed in a translational parallel cable-suspended robot while ensuring a large workspace. One of the applications of such a mechanism is large-scale 3D printing, which typically requires positioning an end-effector with a constant orientation. This concept does not provide practical stability for an end-effector that would apply torque to the robot.

In U.S. Pat. No. 6,809,495, a camera platform is suspended by four cables, with the platform being stabilized by gravity as it hangs from the platform.

For a robot, stability is important because the end effector of the robot can exert force as it performs its tasks. The prior art suspended cable robots are limited in their ability to stabilize the robot end effector without having cables pulling downward.

SUMMARY

Applicant has discovered that stability in a suspension cable robot can be improved by using at least three groups of three cables arranged in a parallelogram manner. The ability to remain stable when subjected to forces acting on the robot platform or end effector is thereby significantly increased.

Applicant has discovered that stability in a suspension cable robot can be improved by locating cable actuation and cable uptake within the robotic platform as the weight of these components improves the stability. Further advantages of locating cable actuation and cable uptake within the robotic platform are simplification of installation and centralization of components at the robotic platform.

In some embodiments, there is provided a cable robot platform apparatus including a platform member, at least three cable groups, each one of the cable groups being arranged to provide a parallelogram support for the platform member about three axes, wherein in use each cable group can extend between the platform member and a wall or ceiling anchor to provide the platform with gravity stabilized resistance to motion from forces and torques acting on the platform suspended from the cable groups within a predetermined limit, and a drive associated with each of the cable groups operable to control a length of the cable groups between the platform member and the anchor. In some of these embodiments, the apparatus can further comprise a motion controller connected to the drive associated with each of the cable groups and responsive to a position input.

BRIEF DESCRIPTION OF THE DRAWINGS

FIG. 1C is a schematic view of a cable robot embodiment similar to FIG. 1A that better illustrates the cable geometry and includes platform location/positioning components and an adjustable attachment platform supporting the robotic arm.

DETAILED DESCRIPTION

Overall Functionality

Figure 1A:
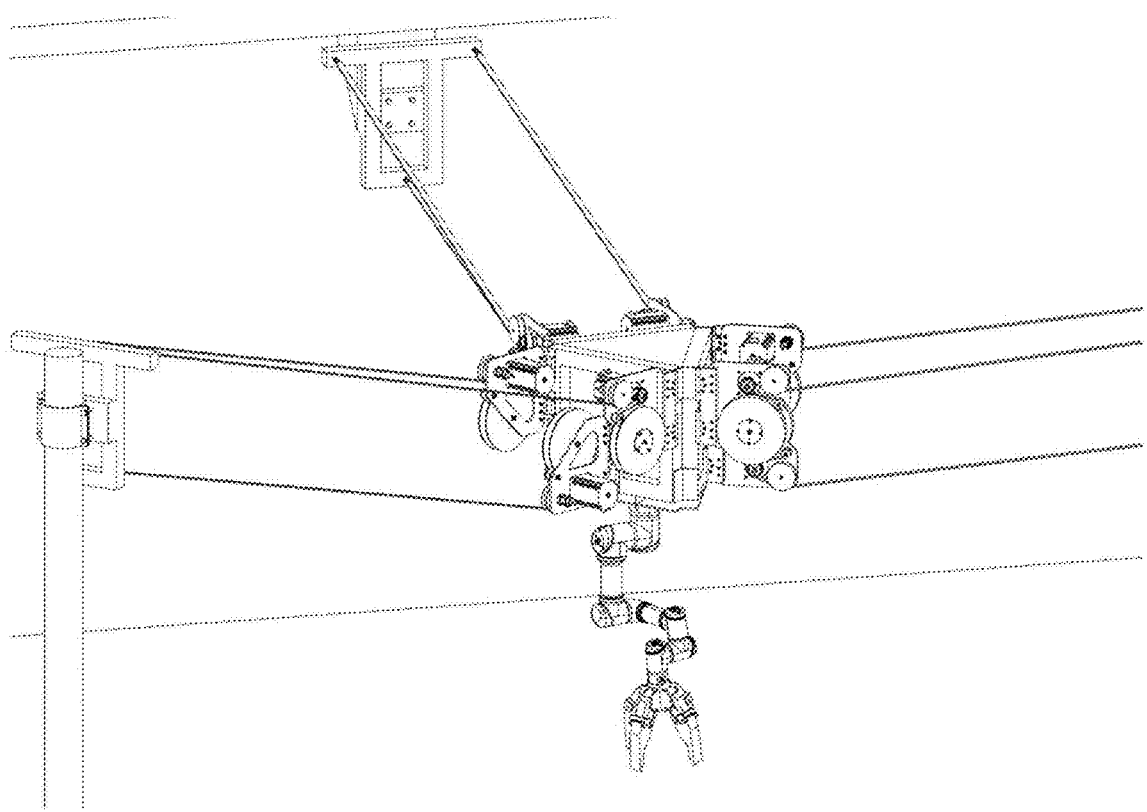
FIG. 1A is an oblique partial view of a suspended cable robot having 3 groups of 3 cables arranged in a parallelogram manner in which cable uptake spools and motors are arranged at the platform and a conventional robotic arm is mounted to the underside of the platform.
Figure 1B:
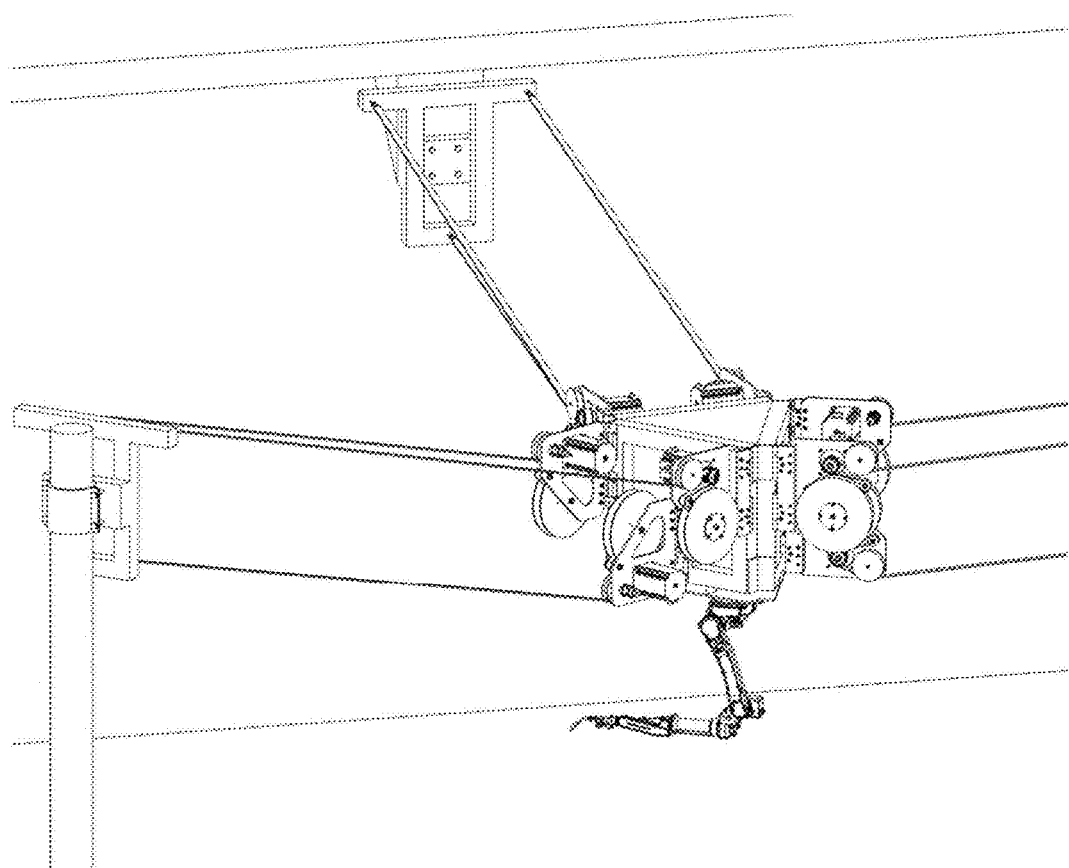
FIG. 1B is an oblique partial view of a suspended cable robot with a welding end-effector mounded upside-down.

A suspended robotic platform using cables can be used to operate precision displacement in 3 dimensions of specialized tools (53) over larger distances (see FIG. 1A and FIG. 1B). In the simplest form, three cables are provided in each group of a total of three groups. A cable group can have four cables, and it is possible to have 4, 5 or 6 cable groups if desired. Thus, the 9-12-15-16-18-20-24 cables can be disposed in 3-4-5-6 groups. 3-4 flexible cables can be placed in such way that they form 3 or 4 parallelograms (80) per cable groups (51) from the central module (50) to the cable group anchorage (52). Tension in cables is induced by gravity, namely by the weight of the central module (50), so all cable groups (51) are oriented towards a higher anchorage point. These parallelograms (80) force the platform to be always planar to a plane and to keep its orientation in the operational environment. Also, the parallelograms (80) provide enhanced stability to vibrations, to payload variation, to inertial redirections and to externally induced forces. They oppose induced forces in relation with a ratio the total weight of the central module, which varies according to the central module (50) position in the operational environment. To add precision, external sensors (54) and stabilization gyroscopes (85a and 85b) can be required depending on the final application. While using exact parallelograms is desirable, it will be understood that tolerance from an exact parallelogram can be acceptable as this can be compensated using appropriate cable actuation control.

To maximize effect of weight of the central module and to facilitate robotic platform integration in its environment, all active components may be included in central module (50). In some cases, active components can be installed on the supporting structure with the same integrated principle, whereas central module (50) would only retain components related to the specialized tools (53).

Application

The robotic platform (FIG. 1A) in this configuration can be used in operational environments that requires to a specialized tool (53) to work over larger than designed for distances. For example, when installed on the robotic platform, a robotic arm manipulator of small size will be capable of covering large areas for handling objects.

Figure 2A:
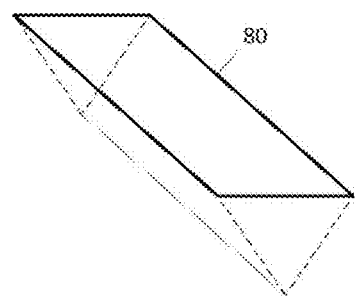
FIGS. 2A, 2B and 2C are schematic oblique views of a cable group of three cables highlighting the upper, left and right parallelograms.
Figure 2B:
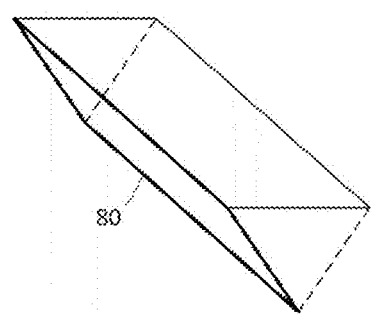
Figure 2C:
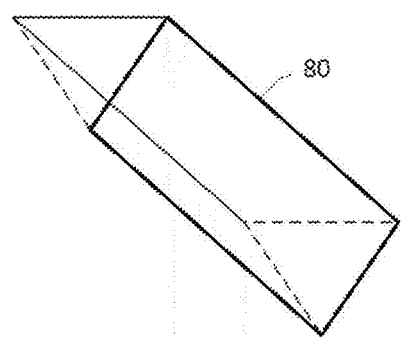

Here are domains of applications when the robotic platform is associated with a specialized tool that is specifically adapted and where automation is involved. Here are examples of where the combination of the robotic platform and the specialized tool can have a realistic purpose, but not limited to:

Material handling (see FIG. 1A)
  Feeding multiple CNC machines with material
  Product assembly
  Component handling
  Warehouse handling
  Shipping handling
  Lab handling
Industrial manufacturing
  Welding (see FIG. 1B)
  Painting
  Polishing
  Sandblasting
  Laser cutting
Inspection:
  Camera
  X-Ray
  Laser distance acquisition
Inventory
  Datacenters
  Warehouse
Human transportation
Restaurant robotic service
3D Printing (large scale).
Cleaning determined area of operation
Building construction
Medical robotics Overall Design The robotic platform suspended by cable and stabilized by gravity (See FIG. 2A, FIG. 2B, FIG. 2C) can be constituted of 3 mains sections which are the central module (50), a number greater than 3 of cable groups (51) and of a tooling attachment platform (60).

Cable groups (51) comprise cables (56), cable management units (57) and a cable group anchorage (52).

The minimal setup to suspend a specialized tooling and move it in a 3D area is when using 3 cable groups of 3 cables.

Figure 4A:
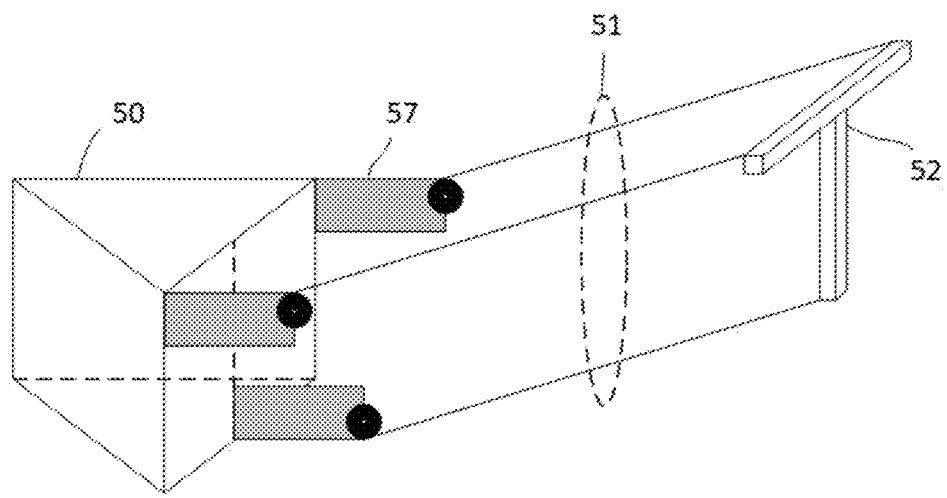
FIG. 4A is an oblique view of the cable group and its attachments, when cable management is centralized on the central module.
Figure 4B:
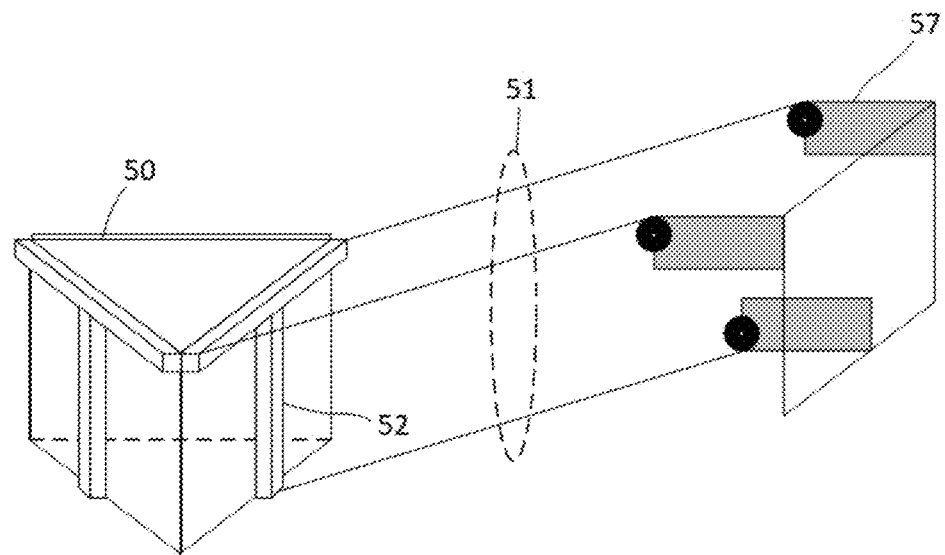
FIG. 4B is an oblique view of the cable group and its attachments, when cable management is distributer at the anchorage points.

All the active systems can be centralized on the central module (50), see FIG. 4A. But in some cases, it can be preferable to have the active components at the cable group anchorage structure (66) as seen in FIG. 4B. In the case the robotic platform is to have a constant orientation and a planar constant in a 3D environment, at least 3 cables (56) of the exact same length can be used in a cable groups (51) and can be installed in a configuration that produces parallelograms (80). To ensure optimal performance and to produce compensations that minimize elasticity effects in overall stability, each cable can be separately monitored in tension with a sensor and can be controlled by a independent cable traction unit (71).

Cable Group

A cable group (51) represents a predefined number of cables (56) (3 or 4) used together. Cables in cable groups are configured in parallelograms (80) that enable the initial stability. Cables (56) are wound and un-wound mostly evenly in a way that parallelograms keep their characteristics while producing movement. One cable traction unit (71) per cable can be used to balance tension and to react to elasticity in the cable group while preserving the parallelogram geometry.

FIG. 1C is an example of 3 cables (56) per cable groups (51) disposition to produce parallelograms (80).

The cable groups (51) may comprise:
1—A given number of 3 or 4 cables (56),
  a. Cables are made from metal ropes or wires, synthetic or natural fiber ropes, belts or chains. A toothed belt has been found to perform well.
2—One cable group anchorage (52)
3—The same number of cable management units (57) than cables (56). In some cases, one cable management units (57) can manage 2 or more cables (56) at the same time by using one motor.

The cable groups (51) connect the central module (50) to the cable group anchorage (52). When the cables comprise chains or are otherwise suitably flexible, the cable management can include a storage container instead of a spool, reel or cassette arrangement.

The attachment points (67) are solid enough points in the operational environment that are used to install the cable group anchorage (52). They are set higher than the central module (50) area or volume of operation.

The cables (56) included in the cable groups (51) can be arranged in any way that can create parallelograms (80). In the case of 3 cables in a cable group, which the attachment points would form a triangle, can also be used in a non-equilateral attachment configuration without any pre-defined orientation. In the case of 4 points of attachment, the attachment points could have any quadrilateral configuration without any pre-defined orientation.

Central Module

The central module (50) can support a separate tooling attachment platform (60) that supports the specialized tool or tools (53). The central module (50) can also include all active control components, power components of the robotic platform. It can also support all control and power items related to the tooling and the tooling attachment platform (60) in active mode.

The central module (50) can be linked to the attachment points (67) through 3, 4, 5 or 6 cable groups (51). The cable groups (51) are attached on the sides of the central module (50) in a way to maximize stability according to the final application.

Figure 3A:
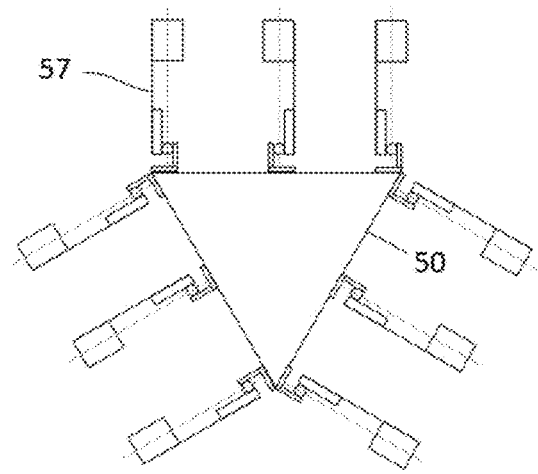
FIGS. 3A and 3B are a top and oblique view of a suspended cable robot having 3 groups of 3 cables arranged in a parallelogram (only one side shown).
Figure 3B:
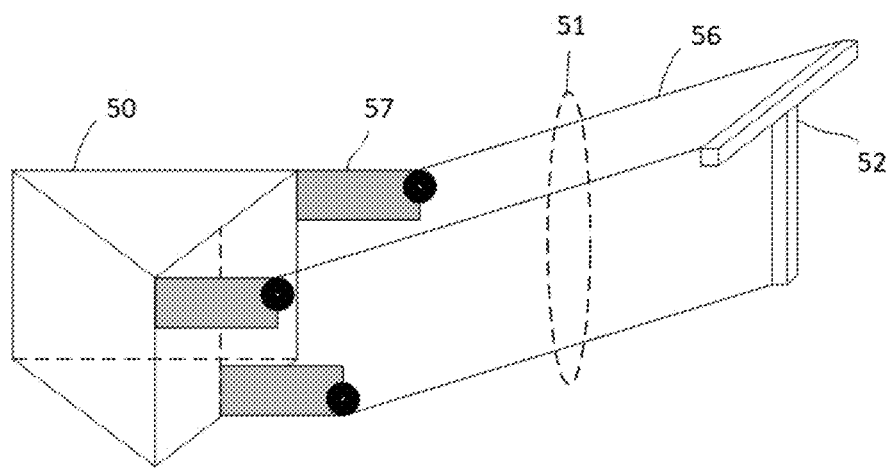
Figure 3C:
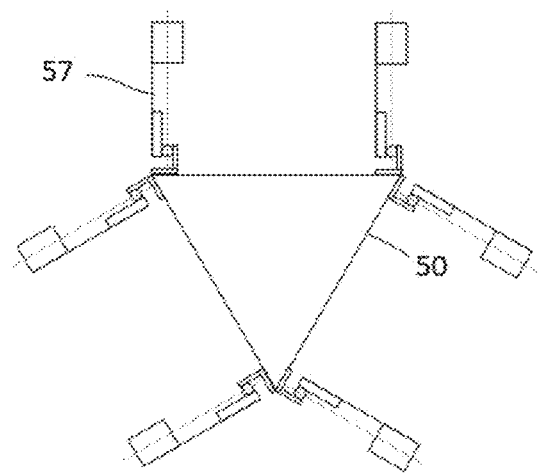
FIGS. 3C and 3D are a top and oblique view of a suspended cable robot having 3 groups of 4 cables arranged in a parallelogram (only one side shown).
Figure 3D:
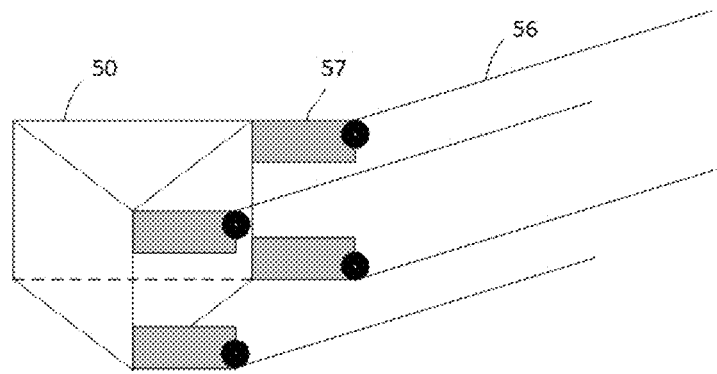
Figure 3E:
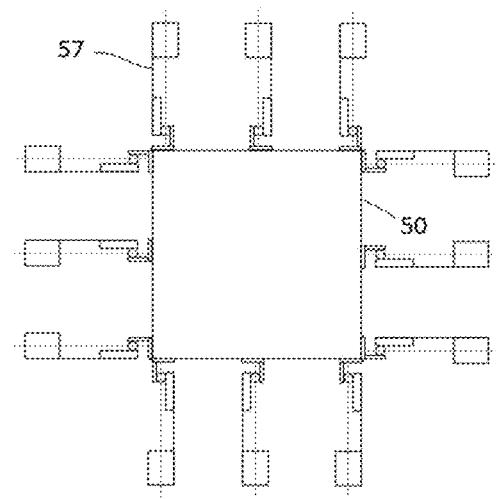
FIGS. 3E and 3F are a top and oblique view of a suspended cable robot having 4 groups of 3 cables arranged in a parallelogram (only one side shown).
Figure 3F:
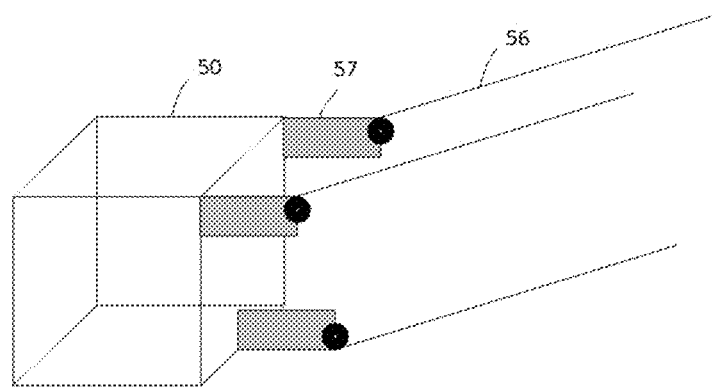
Figure 3G:
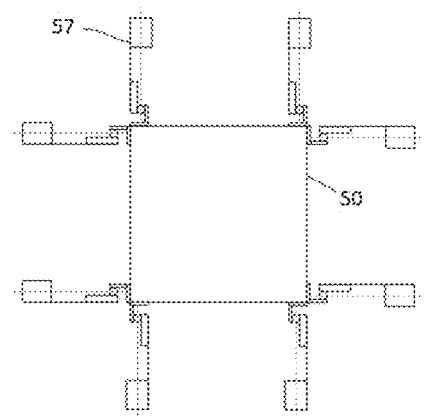
FIGS. 3G and 3H are a top and oblique view of a suspended cable robot having 4 groups of 4 cables arranged in a parallelogram (only one side shown).
Figure 3H:
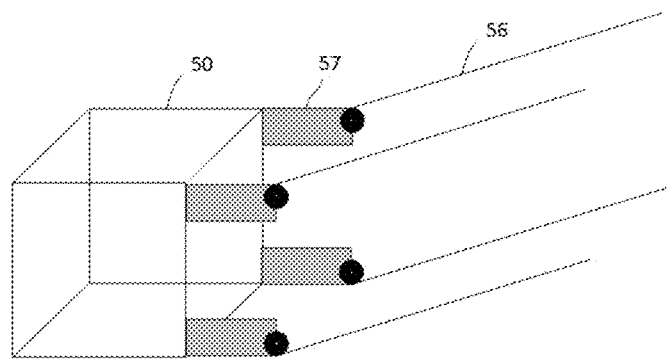
Figure 3I:
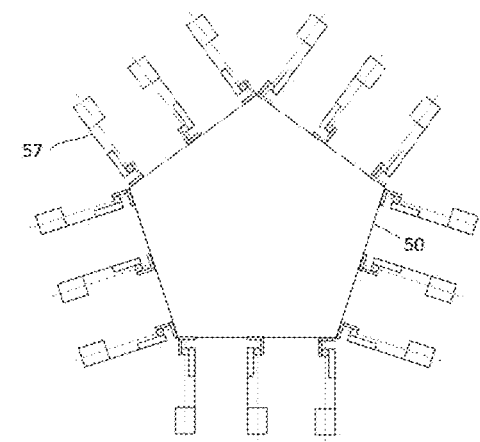
FIGS. 3I and 3J are a top and oblique view of a suspended cable robot having 5 groups of 3 cables arranged in a parallelogram (only one side shown).
Figure 3J:
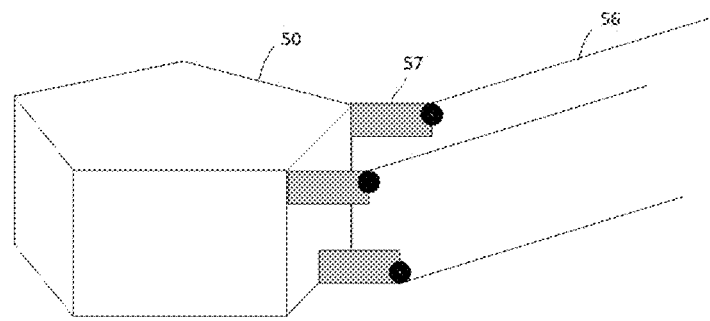
Figure 3K:
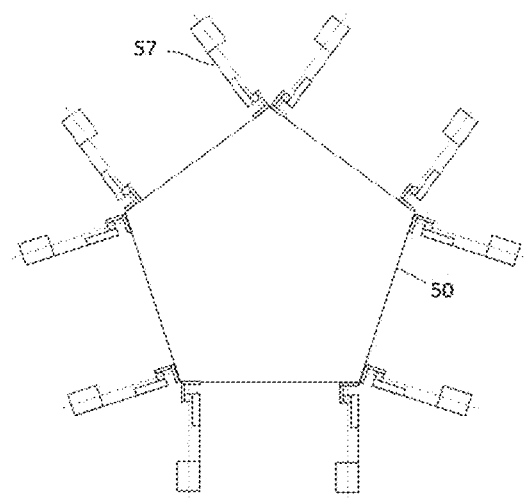
FIGS. 3K and 3L are a top and oblique view of a suspended cable robot having 5 groups of 4 cables arranged in a parallelogram (only one side shown).
Figure 3L:
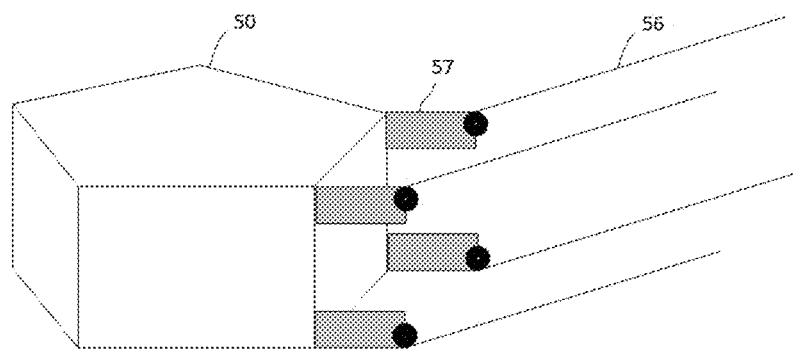
Figure 3M:
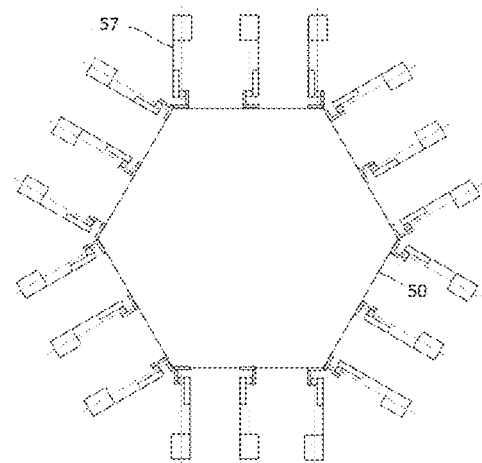
FIGS. 3M and 3N are a top and oblique view of a suspended cable robot having 6 groups of 3 cables arranged in a parallelogram (only one side shown).
Figure 3N:
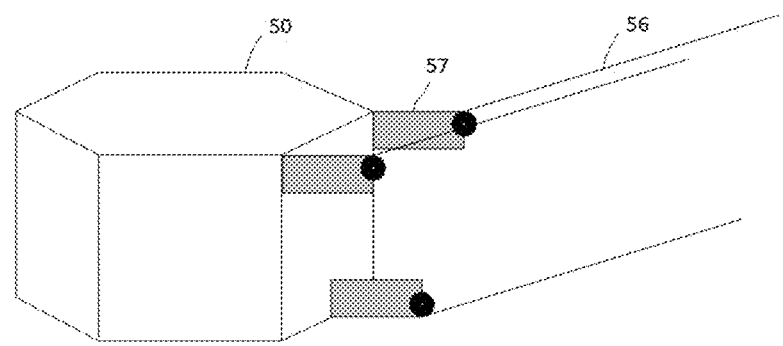
Figure 3O:
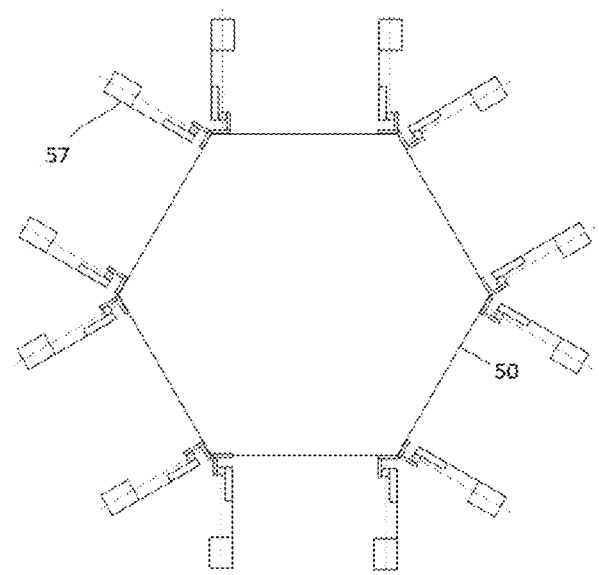
FIGS. 3O and 3P are a top and oblique view of a suspended cable robot having 6 groups of 4 cables arranged in a parallelogram (only one side shown).
Figure 3P:
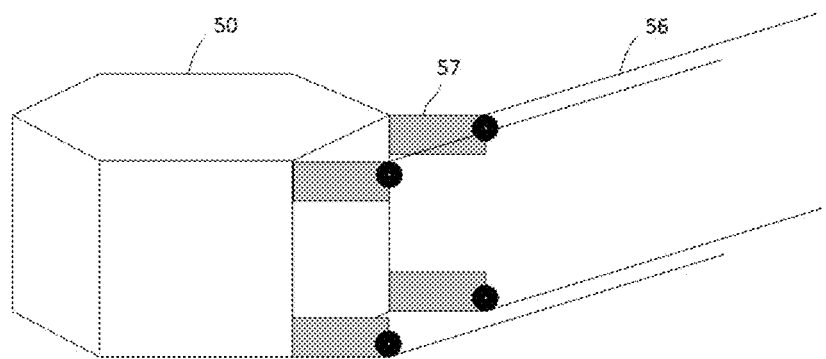

FIG. 3A to 3P illustrates the case in which 3 or 4 cables are used per cable groups (51) FIGS. 3A,3C, 3E, 3G, 3I, 3K, 3M, 3O are top views of the setups and FIGS. 3B, 3D, 3F, 3H, 3J, 3L, 3N, 3P are lateral views of one of the cable groups in the specific setup.

Figure 5A:
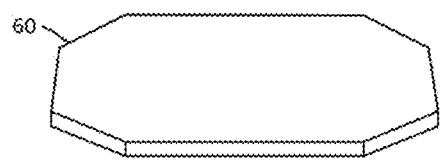
FIG. 5A is showing the attachment platform in its simplest form, which is a plate where the specialized tool is attached.
Figure 5B:
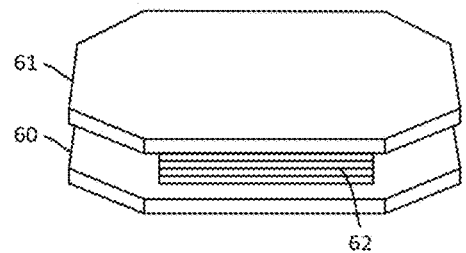
FIGS. 5B, 5C and 5D is showing an active version to the attachment platform which can move sidewise, up and down and in torsion to add precision to final position of the specialized tool.
Figure 5C:
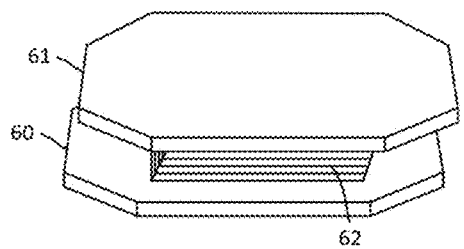
Figure 5D:
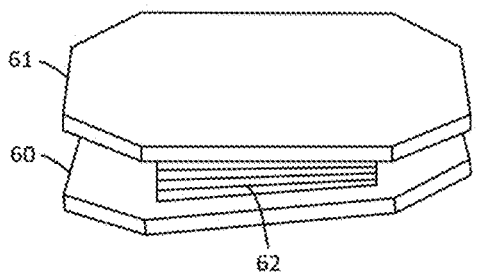
Figure 6:
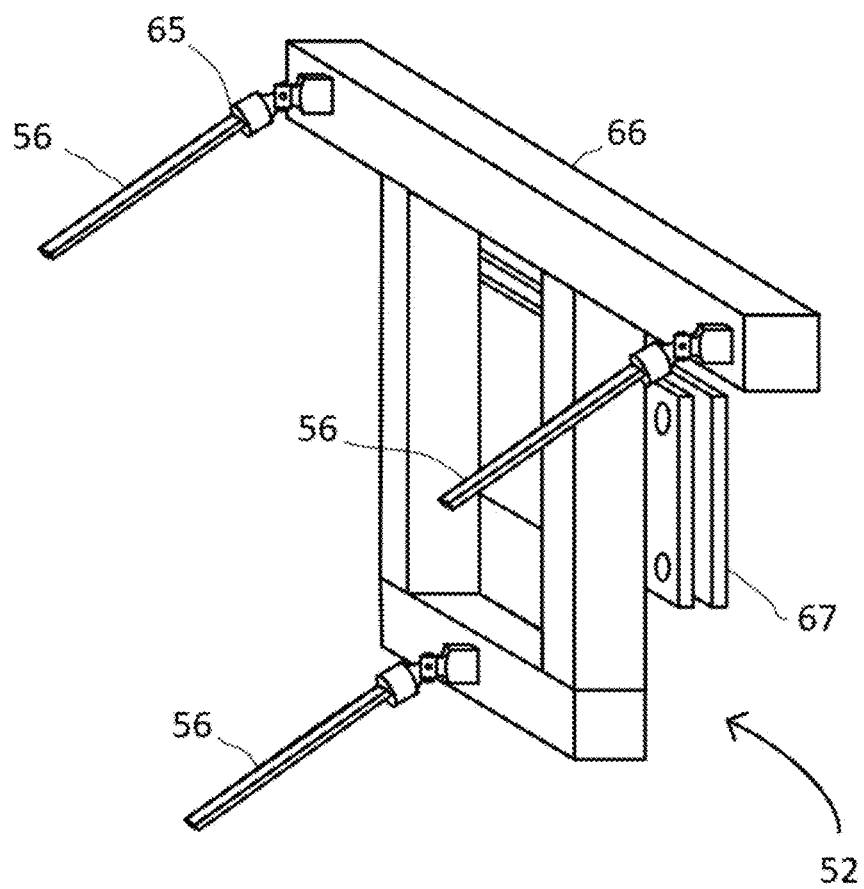
FIG. 6 represents the cable group anchorage.
Figure 7:
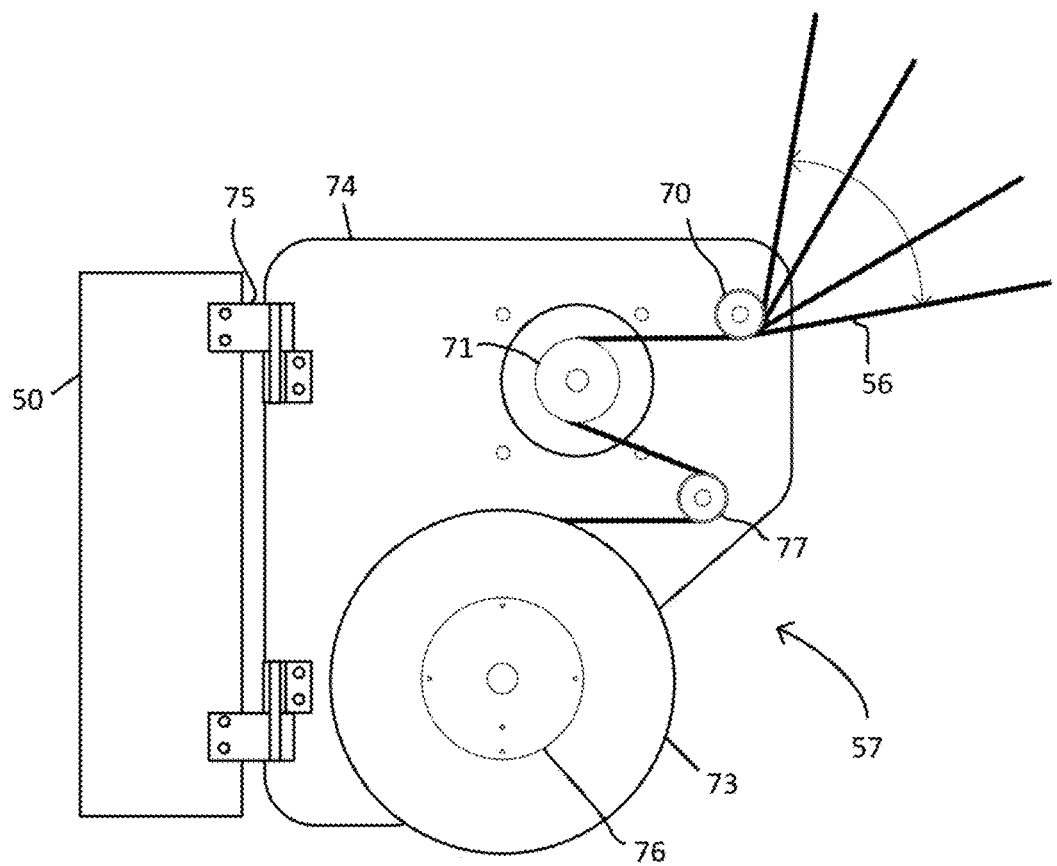
FIG. 7 represents the cable management module.
Figure 8A:
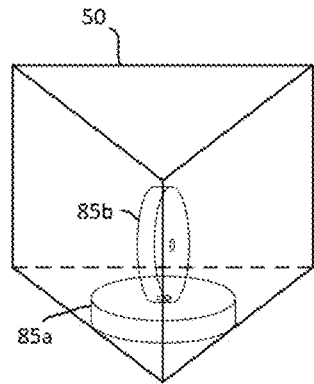
FIGS. 8A, 8B and 8C are showing the different position stabilization gyroscopes can be installed to increase dynamic stability of the central module.
Figure 8B:
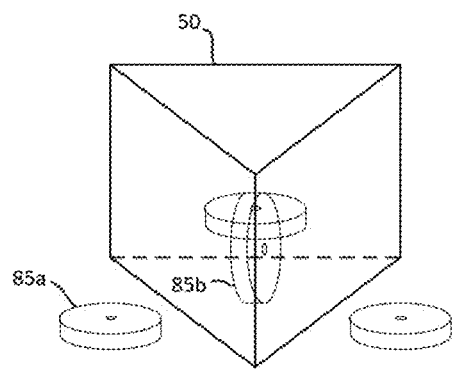
Figure 8C:
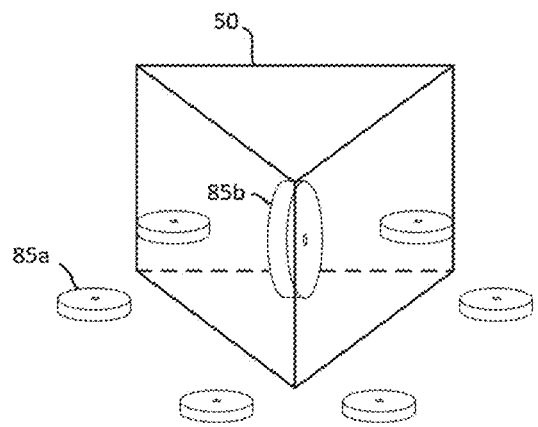
Figure 9:
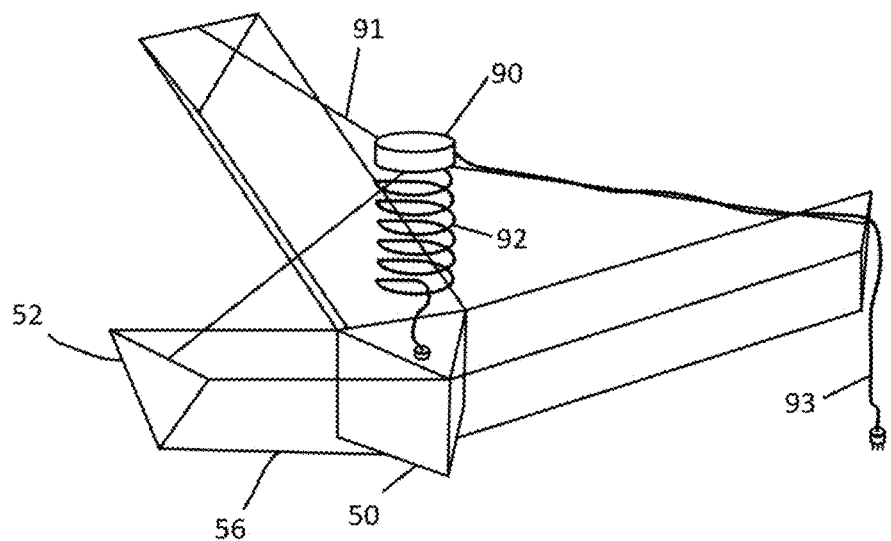
FIG. 9 represent the setup that would normally be used to bring power to the suspended robotic platform.
Figure 10:
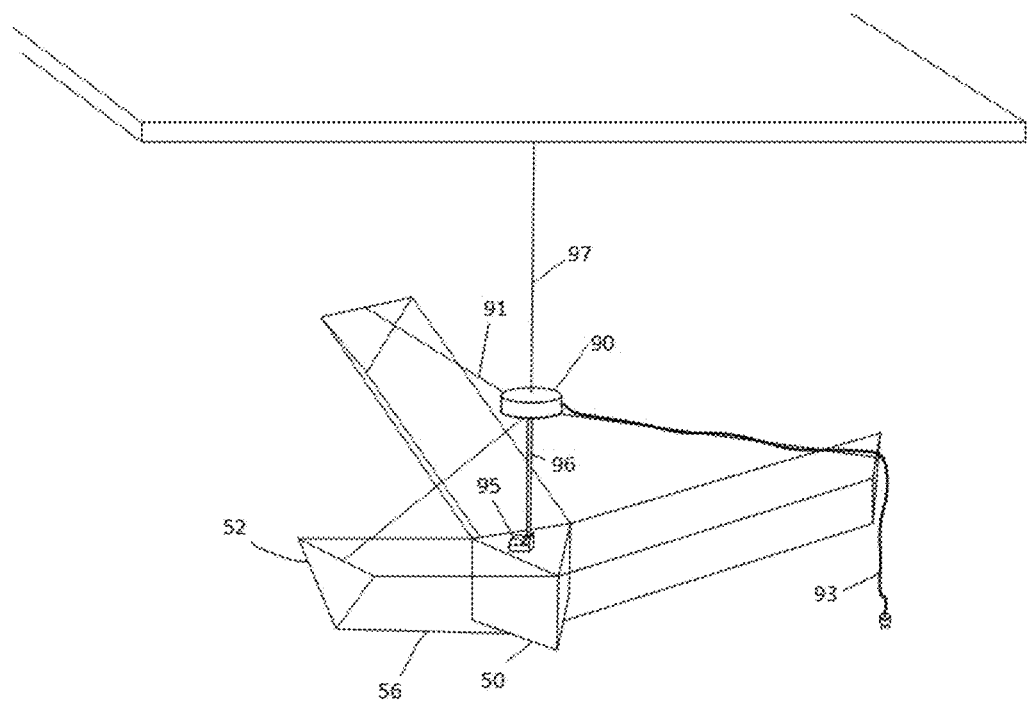
FIG. 10 explains how the safety cable would be installed to support the central module.
Figure 11:
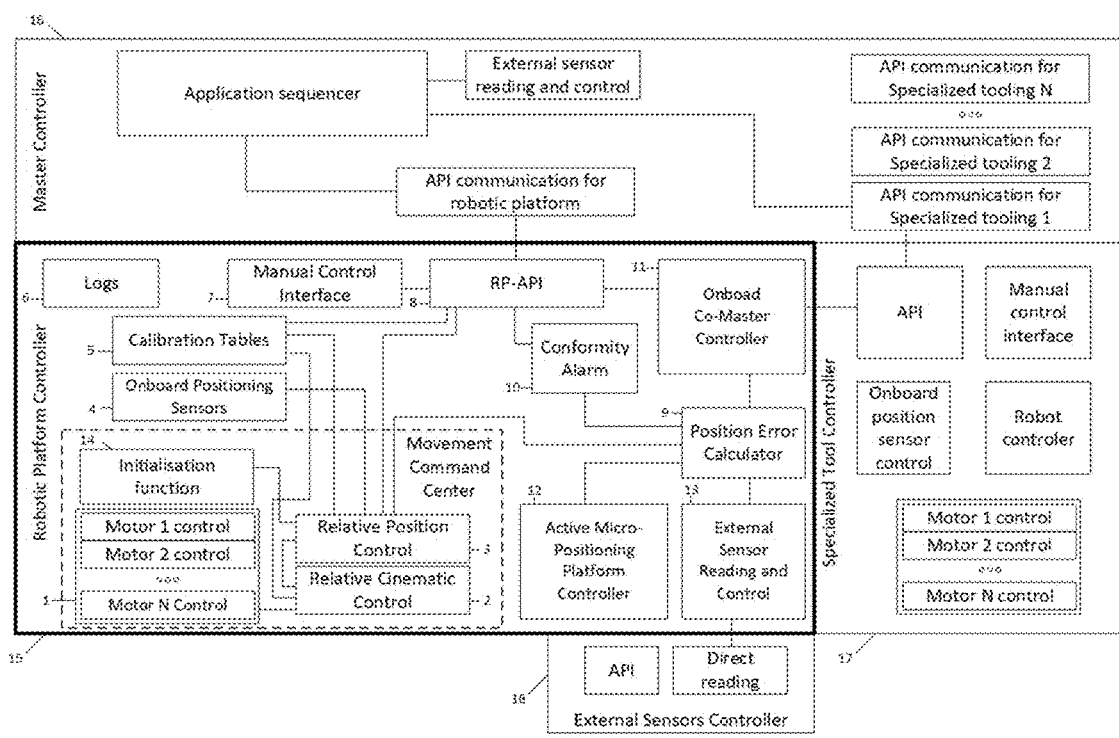
FIG. 11 shows the different software modules that would be involved to make work the suspended robotic platform or that would exchange with it.
Figure 12:
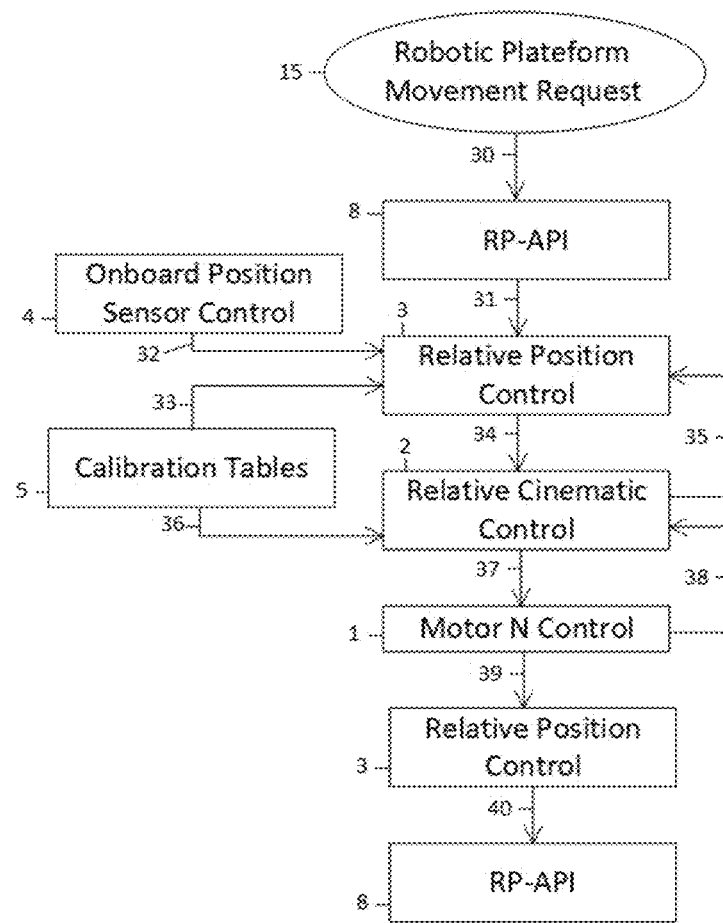
FIG. 12 represent the functional steps to provide movement when the suspended robotic platform is used as is.
Figure 13:
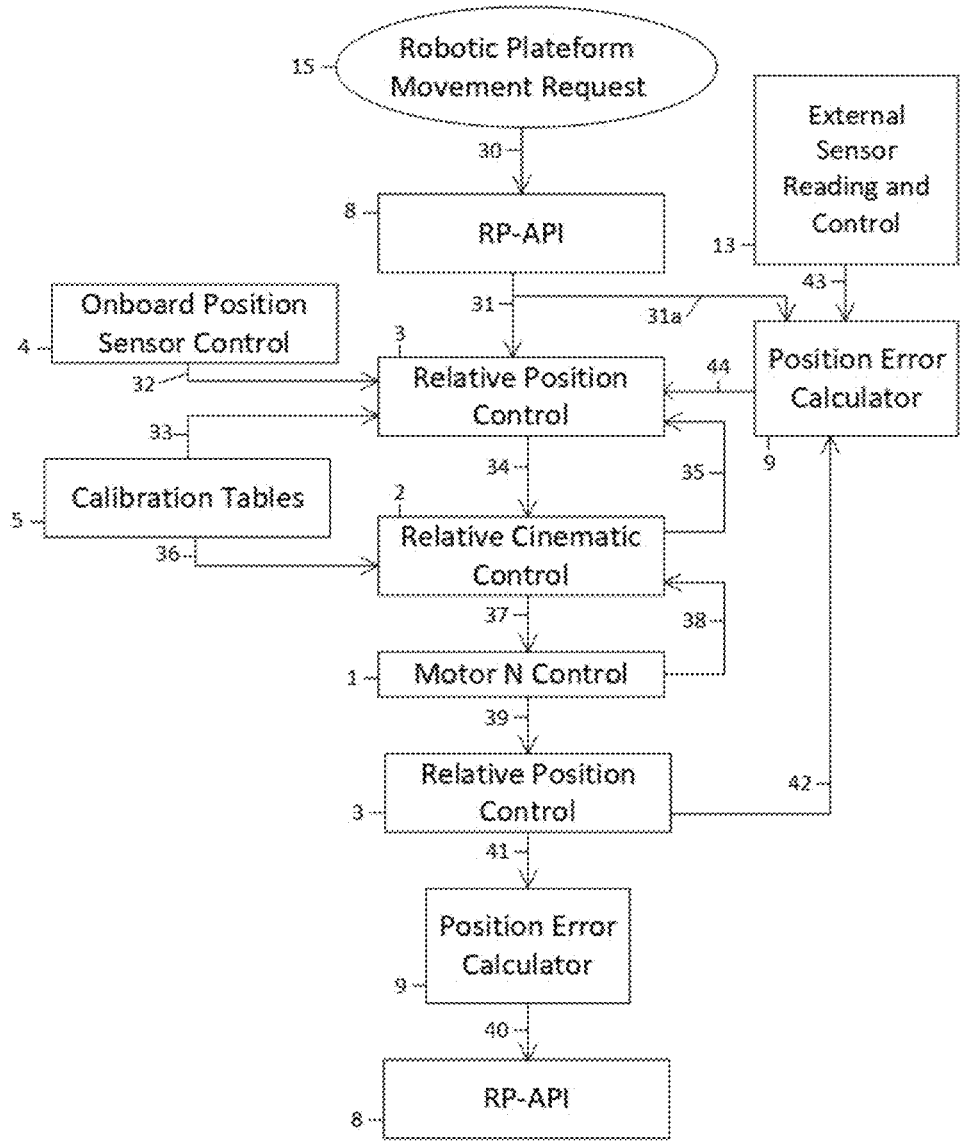
FIG. 13 represent the functional steps to provide movement when the suspended robotic platform is used with external sensors for position feedback.
Figure 14:
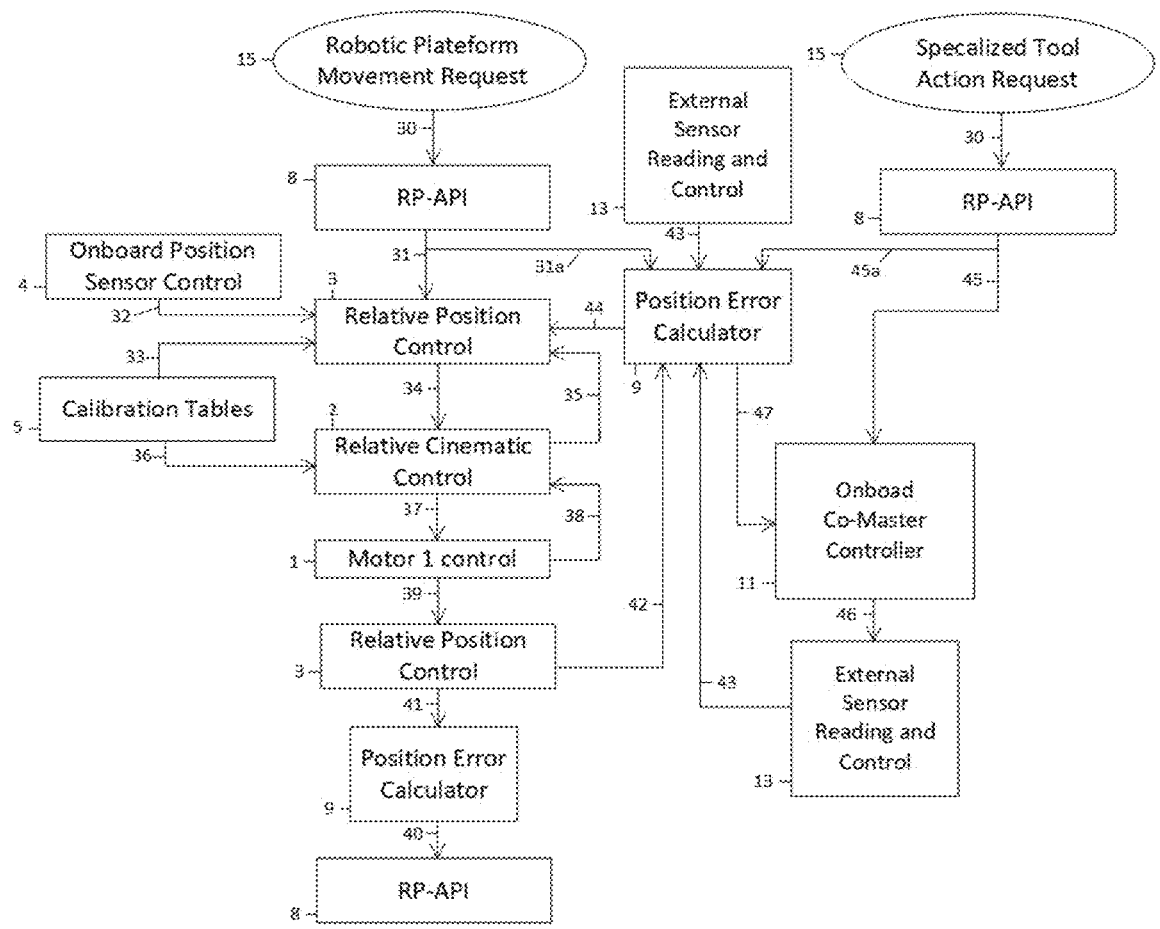
FIG. 14 represent the functional steps to provide movement when the suspended robotic platform precision is compensated by managing positioning of the specialized tool.
Figure 15:
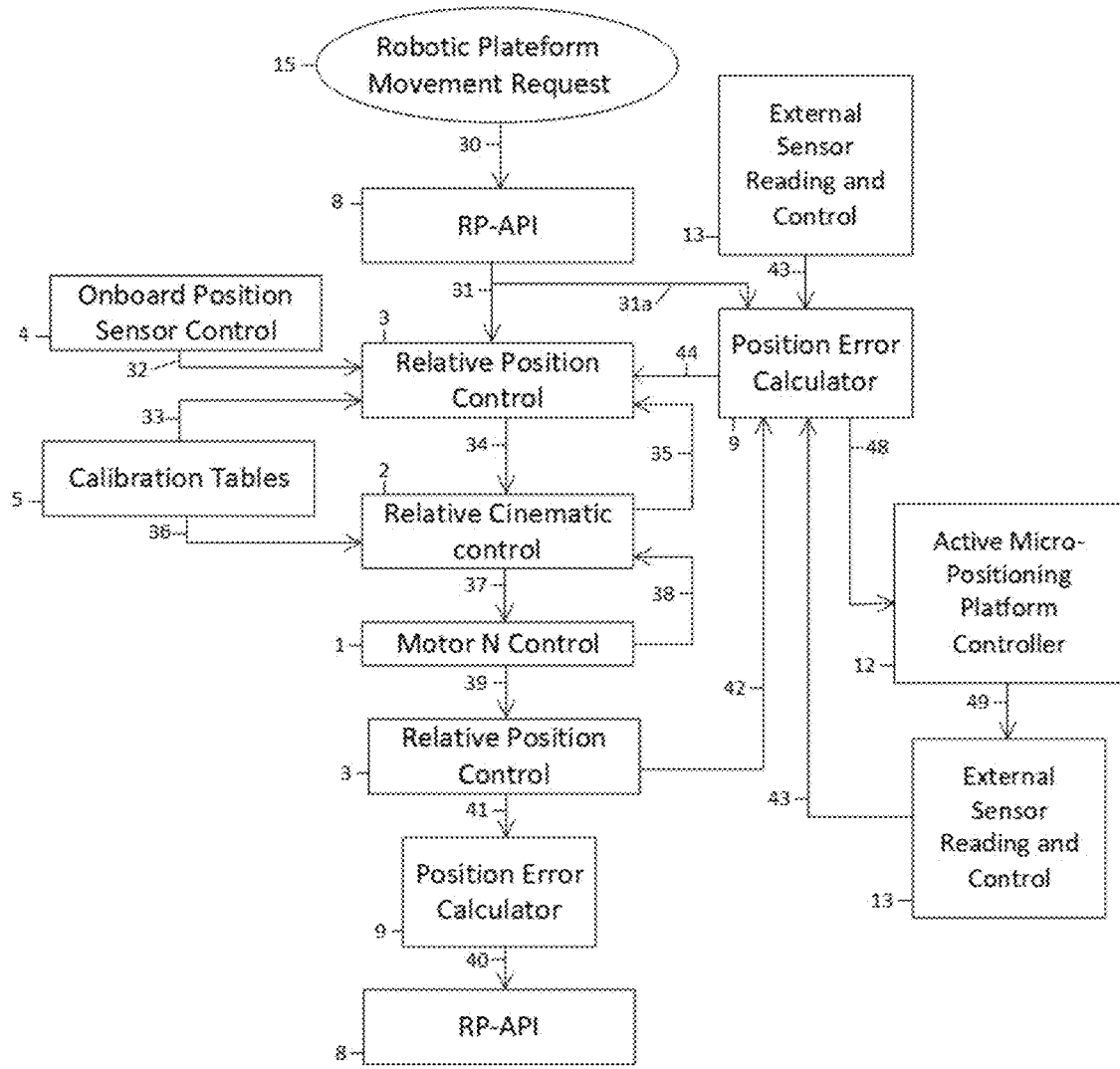
FIG. 15 represent the functional steps to provide movement when the suspended robotic platform is used with an active tooling attachment platform.

The central module (50) can support a specialized tool (53) most likely under it but can also support specialized tools (53) on its tops or on its sides. The platform (60) can also comprise an L-shaped or a C-shaped arm member to allow a robot arm tool (53) to be mounted onto a conventional base at an upper side of a lower end of the arm. The specialized tools (53) can be directly installed on the central module through a passive tooling attachment platform (FIG. 5A) or on an active tooling attachment platform (FIG. 5B, FIG. 5C, FIG. 5D).

Tooling Attachment Platform

The tooling attachment platform (60) can be part of the central module (50) and can be passive and active.

A passive tooling attachment platform (60) can be a specialized assembly plate that connects a specialized tool (53) to the central module (50). It can be installed in a way to connect the specialized tools (53) under the central module (50). In some cases, the plate passive tooling attachment platform (60) can take a specific form and be installed on the sides or on top of the central module (50).

An active tooling attachment platform (FIG. 5B, FIG. 5C, FIG. 5D) can have the purpose of being auto-levelling, auto-positioned and auto-oriented through algorithms from independent sensors. It can also be adjusted in position by the robotic platform so that positioning and movement compensation can be done. It is constituted of a tooling attachment platform (60), a fastening plate (61) to the central module and of actuators (62) that can adjust in position the tooling attachment platform (60).

Cable Group Anchorage

The cable group anchorage (52) can be orientable to maintain the integrity of the parallelograms (80). Once oriented, they can sustain the tension of cables (56) in a way that does not compromise robotic platform's stability by inserting new degrees of elastic bending. The cable group anchorage structure (66) can be strong in a way that it would add negligible elasticity to the cable groups (51) in every direction.

The cable fastener (65) on the cable group anchorage (52) can follow the tension direction without inducing cables (56) bending so that the cable never bends, for example using a universal joint. The bending of the cables (56) depend on the tension and can compromise precision of positioning of the central module (50) and can induce more elasticity.

The cable group anchorage (52) can be installed at the attachment points (67) identified in the operational area according to the minimal structure stability requirements.

Cable Management Module

The cable management module (57) can include the cable traction unit (71), the cable winding cassette (73) or spool, and the tension pulley (70) which can include the tension sensor and that is also used for final positioning of cables (56). It can be used to manage one (mostly) or up to all cables (56) of cable group (51), according to the application, with one motor.

It can be attached to the central module (50) through passive hinges (75) that orient the entire cable management module (57) in the direction of the tension caused by the cables (56) configuration and by gravity.

The cable traction unit (71) includes a motor that can be used in a direct shaft to minimize induced elasticity. In the case that a gear is used to reorient motor direction or that changes the rotation ratio, a non-elastic coupling and a no-dead band gear system can be used.

Cable winding cassette (73) winds up the cable (56) that as it is pulled by the cable traction unit (71). The winding orientation pulley (77) ensures that the cable is always well wrapped around the cable traction unit (71) main pulley. The winding action by the cable winding cassette (73) can be managed passively using a spiral spring assembly (76).

All of the components included in the cable management module (57) can be installed on the cable management structure (74).

Stabilization Gyroscopes

External disturbing forces or forces resulting from specialized tool movement inertia, combined with the elasticity of the cables may influence the robotic platform stability. They will mainly produce torque acting on the robotic platform where around the x and y axes will be slightly off-axis because of the uneven tensions in the cables. Each cable will stretch differently producing a point of rotation initially at the center of the central module.

Consequently, the secondary element that stabilize the robotic platform can be the integration of stabilization gyroscopes (85a and 85b) positioned at certain points of the robotic platform. These stabilization gyroscopes (85a and 85b) can prevent some of the external interference to have influence on the stability and the precision by countering axial movements on the central module (50). The precession force resulting from the stabilization gyroscope (85a and 85b) countering external torques produces less rapid angular additional torques that can be managed more easily with stabilisation algorithms applied at the cable traction unit (71).

To benefit from this concept across all torque possibilities, the robotic platform can include 1× central vertically oriented (by its axis) stabilization gyroscopes (85a) or 1× or 2× as many vertically oriented stabilization gyroscopes (85a) as there are cable groups (51) which would be installed on the cable management module (57). One horizontally oriented stabilization gyroscope (85b) can be installed in the central module (50) to counter torques disrupting orientation of the central module (50) in space.

Note that a stabilization gyroscope (85a and 85b) as defied here is simply a mass in the form of a disk that is balanced to turn at high speed without inducing vibration in the structure.

Safety Top Belt

The safety or security top belt (96) can suspend the central module (50) in case of:
  there is an emergency stop identified,
  the robotic platform must be parked to free operational environment
  a maintenance is required while it is suspended.

In all cases, the security top belt (96) can wind up using the belt winding mechanism (95) which can be done using a reel actioned with a spiral spring while the robotic platform is in operation. The tension on the security top belt (96) does not interfere with the robotic platform stability. The belt needs to be as long as the movement in the operational environment requires it.

The security top belt (96) blocks in theses conditions:
  Power is off,
  One of the motor's power is cut,
  Kill switch is pressed,
  Soft kill switch is activated.

The belt winding mechanism (95) can be passive or active. In passive mode, the blocking systems is by default activated and can be deactivated if a signal is properly received. In active mode, the security top belt (96) can include passive mode features and add a traction motor that provides a ceiling traction unit.

If the safety or security top belt (96) attaches to the suspended electrical box (90), an additional security anchorage cable (97) can link the ceiling or another structure that can support the full weight of the robotic platform and its payload. This can be used to support the weight of the platform when not in use so as to reduce stretching of the cables over time, particularly when the rest or parked position is chosen to high up when the tension on the cable groups is much higher than lower down in a normal working position. The top belt can also be any support connected to the ceiling that the platform can connect to. When the top belt is not always connected to the platform but instead the platform connects to the top belt or support when it is time for the platform to be docked or parked, the platform can have any suitable connector for connecting to the top belt or support, such as an electromagnetic coupling, a hook and eye coupling, etc. The objective is to allow the platform to be suspended at least with most of its weight borne by the vertical top belt or support.

Power Management

In the embodiments in which the cable drives are centralized at platform (50), the power requirements at the platform (50) can be substantial. Likewise, the end effector/robot arm system (53) can require substantial amounts of power.

Power source (93) may come from the operational environment and can be brought to the robotic platform. A power cable (92) can be brought to the robotic platform from the top using tensioned cable (91) that can be links in the middle but over of the operational area to the suspended electrical box (90). These tensioned cables can be attached to the structure through the cable group anchorage (52).

If the cables (56) have an electrically conductive core and have a certified electrical insulation, the necessary power for the robotic platform can be received through these cables.

A battery can be used to power the robotic platform when it is appropriate and meets autonomy requirements for the application. Since it can be an advantage to have extra weight onboard platform (50) for stability purposes, extra battery weight can be suitable.

Stability Kinematic

The robotic platform can be stabilized in at least one of the following ways:
  1—Cable groups (51) disposed as parallelograms (80)
  2—Gyroscopes (85) add high frequency stability
  3—Closed loop motor control using algorithms specific to this robotic platform.

Parallelogram's Macro Stability

Macro-stability is directly induced by the parallelograms (80) when the cables are tensioned by gravity. At any position, the parallelograms force the central module (50) to be leveled (about the x and y axes) and oriented (about the z axis) in a certain direction and so counter, up to a certain level, any disrupting forces that would affect precision in motion. The parallelograms create a hysteresis in relation to the cable's angle (99), the parallelogram geometry and the central module (50) weight.

Parallelograms (80) procure a certain hysteresis effect when cable attachment points are at a certain distance from each other. Depending on the total weight, to enhance general stability required by the application, or for specific stability in corners, the distance between attachment points of the cable may be adapted.

Figure 16:
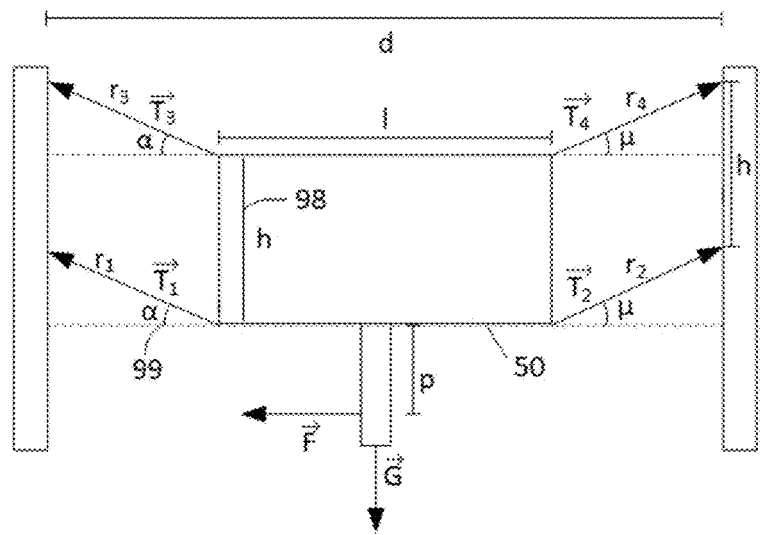
FIG. 16 shows the mathematical identification of the deferent constituent of the suspended robotic platform.

More precisely, about the x and y axes (FIG. 16, side view of the cable groups (51)), if distance value (98) is high the parallelogram (80) will impose better hysteresis. The cable configuration with parallelograms (80) impose to push laterally enough to cause the central module (50) and its specialized tool (53) to lift. The action of hysteresis is imposed by the 2 diametral opposed cables from opposed parallelograms.

Figure 17:
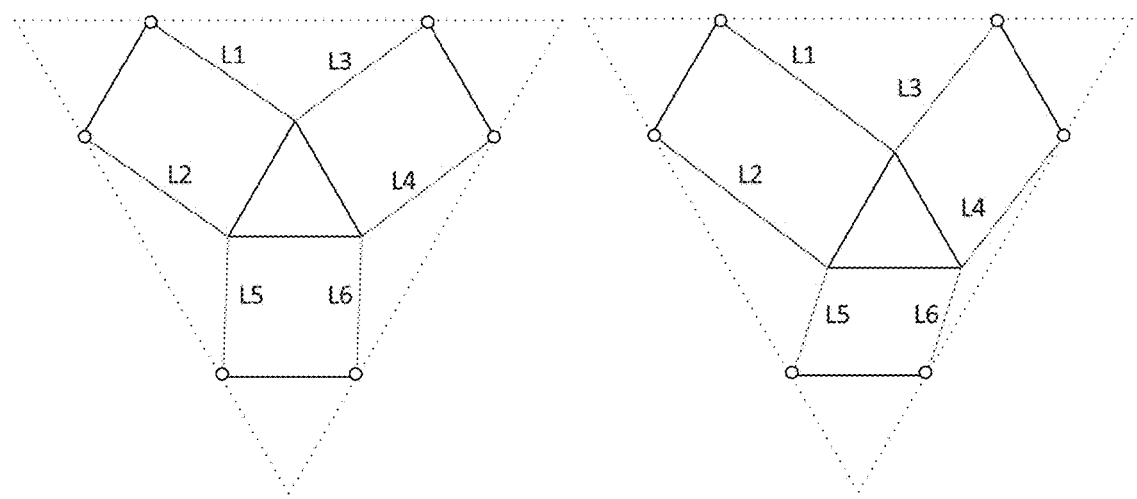
FIG. 17 shows the top view of the parallelogram effect on the central module.

The principle is similar regarding the orientation hysteresis about the z axis (FIG. 17, top view of the cable groups (51)). The cable tension imposes a movement following the edge of a sphere that lifts the central module (50) and its specialized tool (53).

When in movement, inertia of the robotic platform can affect stability and so is limited to certain values of acceleration and deceleration of the central module. These values also depend on the cable's angles (central module position in space) and total suspended weight but also of the speed variations applied to the central module and the center of mass position and variance due to the operating specialized tool (53).

Effect of Elasticity

Elasticity could only depend on the cable construction which is translated in an elasticity constant. But in some cases, where operation area provides a low-quality cable group anchorage structure (66), some extra elasticity can add to the compensation complexity. In this case, tests on structure must be done to characterize vectoral elasticity effects.

Elasticity can cause position imprecision and can make the central module oscillate. This constant can be used in stability algorithms that also have a relation with cable length, with cable angle, with attachment point position, central module weight, on central module dimension and on central module velocity.

Gyroscopes, disposed the way explained previously, will help attenuate the effect of elasticity on stability when robotic platform velocity changes (speed variation od direction changes).

Limitations

Lateral stability, which exists because of the lateral tension component in cables, is in relation with gravity effect on the central module (50) and the angle of cables. When central module (50) is in the corners of the operation environment, 90-degree angles appears (in reference to horizontal) and some of the cables (56) cannot be laterally tensioned. This robotic platform cannot guarantee stability in this situation and so the area of operation can be confined in a smaller 3D space, limited by maximum angles that the cables makes to procure the minimal lateral tension for the application. The robotic platform cannot operate with good stability beyond the area where its cables make 90-degree angles.

To solve some issues related to stability in corners because of a parallelogram (80) that becomes too lean, the cable group anchorage (52) can be inclined. This also would influence the position of cable management module (57).

There is also a limitation in reaching a certain height because the smallest the angle (99) of the cables with the horizon, the more the motor are working against each other. The maximum height depends on the application requirement and will imply using the appropriate motor sizing.

Initialization: finding robotic platform's position of origin
Calibration Minimal Requirements
Characteristics of motor encoder: number of ticks, precision of motor
Characteristics of the winding gear: circumference.
Characteristics of the last tensioning gear: circumference, tension sensor flexibility
Distance between the central module edge and the last tensioning gears
Dimension of the central module and relation to the point of reference
All distance between the last tensioning gears
Distance of cable a connection on anchorage
Maximum tension allowed in the cables
Gyroscope and accelerometer precision
Theoretical cable tension data matrix at level vs position in space.

Initial Conditions
Robotic platform can be:
  On the floor
  Suspended in the center
  Suspended in a un-centralized position Initialisation Sequence
1. Adjust tension in cables while finding level using 2 electronic level sensors
   a. Get initial level reading for both rotation
   b. Calibrate tension over top cables by pair.
   c. Set each bottom cable the tension to get proper level
   d. Find middle by having the same tension scheme in each top cable
   e. Get level reading for both rotation
   f. Loose bottom cable
   g. Re-adjust tensions on each top cable
   h. Adjust tension on bottom cables
2. Find relative position by reading cable measurement stubs
3. Find top max distance:
   a. by winding all cable till tension sensor hits the threshold value of the motor capacity. (Setting in the calibration data)
4. Find floor distance with one of these methods:
   by lowering down the robotic platform slowly till the proxy switch is triggered.
   by measuring with a laser, the height distance from a reference beacon (which position is measured).
   by measuring the floor distance with a laser distance sensor.
   by knowing the distance from each of the cable group anchorage (52) to the reference floor (included in calibration data at installation)
5. Perform dynamic tests to validate resonances and adapt acceleration and deceleration constraints.
6. Perform a sequence with specialized tool to adapts stability compensation algorithms.

Functional Diagram

Main Context of Usage

The robotic platform is used in a context where it contributes in a manufacturing or a in handling operation. This can include painting, welding, cutting, optical, X-ray or ultrasound inspection, object sorting, etc. The robotic platform can be controlled by a master controller (16) that is responsible for the full operation specific to the application. The robotic platform can be part of simple operation where it is central to the task or of a complex operation requiring many robots, many automated specialized tools and external sensors (18). The robotic platform can gather information through feedback from external sensors (18) that will assist it to achieve targeted precision of movement. To counter the possible incapacity of the robotic platform of getting the required precision, is also capable of taking full or partial control the specialised tool to do final adjustments to its movements or its positioning.

Description of the Master Controller

The master controller (16) is the entity that commands the different items that are used to perform an automated operation. It sends commands to the robotic platform controller (15) and to the specialized tool controller (17) and receives feedback from these entities to adjusts its course of action.

Description of the Specialized Tool Controller

The specialized tool controller (17) is the entity to which the master controller (16) gives commands to perform a part of the manufacturing or handling operation. This tool is usually part of what would perform the specific processing in the manufacturing operation. The specialised tool is attached to the robotic platform and can also be controlled directly by the robotic platform controller (15).

Description of the External Sensor

The external sensors (18) is one or many devices that are not part of the robotic platform but that are used to feed the robotic platform with additional positioning and movement information. The information received will be processed to validated positioning or to add precision in the robotic platform movement.

Description of the Robotic Platform Controller

Part of the movement command center.

Block 1: Motor N Control Modules

The motor N control module (1) can control individually each motor depending on its type through the specific controller's API. Such a motor controller having an API interface is known in the art. It can send the commands to produce movement of a motor and acknowledge that the request has been successfully executed. The motor N control module (1) can be always aware of motor rotary position by command accumulation and by feedback from encoders (or the motor controller's feedback), by the status of the limit switches and the status of the motor brake (or clutch). It can also be aware and consider the default settings, the minimum and the maximums of the motor capacities.

Each motor N control module (1) can receive its position, speed, accelerating and timestamp from the relative kinematic Control module (2). It must respect every parameter or send an error code. The Motor N control module (1) feeds back the executed distance after each movement.

Block 2: Relative Kinematic Control Module

The relative kinematic control module (2) can sequence requests to each motor N control module (1) to ensure that movement path is respected in speed and in acceleration to obtain final positioning. This module can consider the information received by the sensors and adjust the commands sent to each motor N control module (1) to ensure proper movement and positioning. This module can comprise a microcontroller with suitable code.

The relative kinematic control module (2) can send commands on a per-motor basis to the different motor N control module (1). Relative position control module (3) can have information on robotic platform position and path and can be transmitted to the relative kinematic control module (2). Position can be in relation of a reference point on the robotic platform. Adjustment can be made while the onboard position sensor control module (4) gives feedback to the relative kinematic control module (2). The calibration tables (5) can give per motor pre-set metrics relative to the robotic platform's construction for the relative kinematic control module (2).

Block 3: Relative Position Control Module

The relative position control module (3) is the robotic platform's awareness of the position of the platform. It can receive the commands to move and determine using the various information received in feedback the compensation to acquire new position.

This module need not comprehend the context of each motor. Most of the compensation instructions can be transmitted to the relative kinematic control module (2).

The RP-API (8) can transmit movement instructions from the master controller (16) to the relative position control module (3). The position error calculator (9) can give compiled and processed feedback from external sensors controller (18), from the specialized tool controller (17) and from the active platform controller (12) to adjust positioning of the robotic platform. The initialization function (14) can give the commands and receive the feedback to find positions in space. The calibration tables (5) can give overall pre-set metrics relative to the robotic platform's construction for the relative position control module (3). The onboard positioning sensors (4) can give constant feedback to the relative position control module (3) to adjust positioning of the robotic platform. The relative kinematic control module (2) can receive movement instructions from the relative position control module (3) and execute them.

Other Modules

Block 4: Onboard Positioning Sensors

The onboard positioning sensors (4) module can interface with various standard sensors used on the robotic platform to ensure its correct positioning. It can give a timestamp to all readings, accumulate them and transmit to other modules the requested values.

Sensors types can comprise one or more of:
Tension sensors
Cable (56) position sensors
Proxy switches (limit switches)
Accelerometers and electronic gyroscope sensors
Angle sensors This module can also store and retransmit values from the motors (current sense, rotary encoders)

The relative position control module (3) and the relative kinematic control (2) can receive position and stability information from the onboard positioning sensors (4) in a formatted and time stamped form.

Block 5: Calibration Tables

The calibration tables (5) may contain calibration parameters that are defined at manufacturing and stored in the robotic platform's memory.

Examples of calibration data that other modules can use:
Cable elasticity coefficient
Motor rotary settings and feedback configuration
Structure traction added elasticity
Structure torsion elasticity
Mechanicals characteristics (pulley diameter, distance between each cable management module).
Off-axis angles of the cable management module (57).
Parallelogram unevenness.

The relative position control module (3) can take into account the data in the calibration tables (5) to calculate its trajectory and fine tune its relative position. The relative kinematic control (2) can take into account the data in the calibration tables (5) to control the motor controller modules. The RP-API (8) can read and write in this module when in factory mode.

Block 6: Logs Module

The logs module (6) can store information from all modules, including all commands received from the master controller (15). Depending on the amount of space available to store logs, rotation of logs can be done depending on the type of information to retain.

Logs can be used for debugging purposes and to feed other monitoring modules (Onboard supervisor such as the position error calculator (9) or from the master controller (16).

All modules can receive and store information relative to the function of the modules.

Block 7: Manual Control Interface

The manual control interface (7) can be a GUI that allows for manual steering of the robotic platform. The GUI can be a web page and can be accessed directly on the onboard PC or can be remotely accessed with the help of a browser using a Wi-Fi connection (this module can be supported on a web server).

The RP-API (8) can receive movement instructions from the manual control interface (7) as if they where sent from the master controller (16).

Block 8: RP-API

The RP-API (8) (Robotic Platform Application Protocol Interface) is the interface with which the master controller (15) can communicate with the robotic platform. All commands can be pre-defined. The RP-API (8) can receive instructions or give back information to the master controller (15). A time stamp can be associated with each request.

The RP-API (8) can have commands that interact with each module included in the robotic platform controller (15), for configuration purposes. For movement requests, it can act mainly with the relative position control module (3).

Optional Modules

Block 9: Positioning Error Calculator

The positioning error calculator (9) can act as the precision supervisor for positioning and movement. The module can receive absolute positioning information from the external sensor reading and control (13) and can be aware of the positioning context of the relative position control module (3). Through data aggregation and calculation, this module can give feedback to the relative position control module (3) to reduce the gap between the relative position to the absolute position.

When compliance with precision requirements is impossible just using the robotic platform, it can:
  create an alarm that stops the robotic platform
  feed commands to the specialized tools (53) through the on-board co-master controller (11) to adjust the tip position in regards of the position variation.
  feed commands to the active tooling attachment platform (60) to reduce the gap with the position differences.

The module can also correct paths while moving and not only final positions. This module can be managed using artificial intelligence.

Sensor information coming from the external sensor reading and control (13) must be validated by the positioning error calculator (9) with the all other feedback to ensure that the absolute positioning calculation is the most relevant. The positioning error calculator (9) module gives movement instructions to the relative position control module (3) to adjust positioning according to the external sensors (18). The positioning error calculator (9) gives positioning information to the active micro-positioning platform controller (12) to adjust position to the specialised tool. The positioning error calculator (9) give positioning information to the on-board co-master controller (11) to do specific adjustments of the position to the specialized tools (53). The positioning error calculator (9) send an error code to the conformity alarm module (10) if it cannot resorb position or movement errors with the various actions it can take.

Block 10: Conformity Alarm Module

The conformity alarm module (10) can be the only module responsible for stopping the robotic platform or to execute an overriding sequence of commands. This module can be used for all safety and security processes in reaction to all non-conformity. Errors detected can be cleared by the master controller (16).

The positioning error calculator (9) can send a command to the conformity alarm module (10) if it cannot resorb position or movement error with its various actions it can take. The RP-API can retransmit conformity alarm module (10) information to the master controller (16).

Block 11: Onboard Co-Master Controller

The onboard co-master controller (11) for specialized tools is an interface included in the robotic platform that communicates commands for the specialized tools (53). It can be driven by the master controller (16) or by the positioning error calculator (9). This module can serve the needs of implementing position and movement corrections at the specialized tools (53) level to ensure accuracy that is higher than the robotic platform can sustain. It can also be used to ensure coordinated movements between the robotic platform and specialized Tools (53).

The positioning error calculator (9) can transmit to the onboard co-master controller (11) the position of movement error correction that can be required to obtain the correct precision. The RP-API can retransmit commands from the master controller (16) to the onboard co-master controller (11).

Block 12: Active Micro-Positioning Platform Controller

The robotic platform can include an attachment platform where the specialized tools (53) can be attached. In the case the attachment platform is active, through commands, the active micro-positioning platform controller (12) can carry out the signals that control the active platform.

The positioning error calculator (9) can indicate to the active micro-positioning platform controller (12) the position and movement adjustments to achieve the required precision.

Block 13: External Sensor Reading and Control

The external sensor reading and control (13) can take information of external sensors that have been added to the application to ensure better absolute positioning or movement acquisition. The external sensor reading and control (13) also can have the ability of configuring these sensors to get from them the requires information.

The positioning error calculator (9) can receive in inputs the readings made by the external sensors (54) reading and control module.

Variants of Usages

Flow 1: Commanded Direct movement execution

30—The master controller (16) request the robotic platform to perform a movement toward a specific position.

31—The robotic platform acknowledges request and send the instructions in a standardized way to the relative position control module (3).

32—The relative position control module (3) refers to the onboard positioning sensors (4) to calculate the movement to be done.

33—The onboard positioning sensors (4) refers to the calibration tables (5) to calculate the movement to be done.

34—The onboard positioning sensors (4) send out the segmented movements to the relative kinematic control module (2).

35—The relative kinematic control module (2) gives feedback to the relative position control module (3) over feasibility and on actual movement details.

36—The relative position control module (3) refers to the calibration tables (5) to calculate the movement to be done for each motor.

37—The relative position control module (3) send out standardized commands per motor N control module (1) to generate movement.

38—The motor N control module (1) sends back information on position and movement so that the relative position control module (3) can validate moment and acknowledge command.

39—Once movement is completed, relative position control module (3) is informed of the request is completed.

40—RP-API (8) is informed and ready to transmit movement completion status to master controller (16).

Flow 2: Commanded direct movement execution with external feedback

31a—The positioning error calculator (9) is also informed of the movement requested from the master controller (16).

43—The positioning error calculator (9) is informed from the external positioning feedback.

44—The positioning error calculator (9) informs constantly the relative position control module (3) of its version of the position 42—Once the movement is done, the relative position control module (3) gives feedback to the positioning error calculator (9).

41—If final positioning is correct, it's the positioning error calculator (9) that informs the master controller (16).

Flow 3: Commanded Movement Execution with Specialized Tool Management.

45—RP-API (8) gives normalized instruction to the onboard co-master controller (11).

45a—The RP-API (8) informs the positioning error calculator (9) of the specialized tools (53) commands to validate error on expected result.

46—Movement produce on the specialized tools (53) affect reading from the external sensors (54).

47—The positioning error calculator (9) gives specific instruction to the onboard co-master controller (11) to adjust the specialized tools (53) according to the final positioning requested.

Flow 4: commanded movement execution with active attachment platform micro-positioning.

48—The positioning error calculator (9) orients the active attachment platform to fill the gap with the positioning instruction.

49—The external sensors (54) are influences by the active tooling attachment platform (60) adjusted orientation.

What is claimed is:

1. A cable robot platform apparatus comprising:
    a platform member;
    at least three cable groups, each one of said cable groups having at least three cables and being arranged on one side of said platform member and having at least three cable connection supports spaced apart to form vertices of a vertically-arranged polygon to provide a parallelogram support for the platform member about three axes, wherein in use each cable group can extend between the platform member and a wall or ceiling anchor to provide said platform with gravity stabilized resistance to motion from forces and torques acting on said platform suspended from said cable groups within a predetermined limit; and
    a drive associated with each of said cable groups operable to control a length of said cable groups between said platform member and said anchor, wherein said drive controls a common length for each cable within each one of said at least three cable groups.

2. The apparatus as defined in claim 1, further comprising a motion controller connected to said drive associated with each of said cable groups and responsive to a position input.

3. The apparatus as defined in claim 1, wherein said drive comprises a spool for each cable of said cable groups.

4. The apparatus as defined in claim 3, wherein said spool is located at said platform member, said cable groups being fixedly anchorable to wall or ceiling anchors.

5. The apparatus as defined in claim 1, further comprising a tension measurement element associated with said cable groups for providing a tension signal representing tension in said cable groups.

6. The apparatus as defined in claim 5, further comprising an alarm condition detector having as input said tension signal and as output a signal representing a risk of instability due to a loss of tension in at least one cable of said cable groups.

7. The apparatus as defined in claim 5, further comprising a stretch calculator having as input said tension signal and a measurement of said length of said cable groups, and as output a signal representing an adjustment to said measurement of said length of said cable groups.

8. The apparatus as defined in claim 1, wherein said platform member comprises an active tooling attachment platform.

9. The apparatus as defined in claim 1, further comprising position sensors operative for sensing a position in space of said platform member.

10. The apparatus as defined in claim 1, wherein the number of said cable groups is three and each cable group comprises three cables.

11. The apparatus as defined in claim 1, wherein said cable groups comprise toothed cables or belt.

12. The apparatus as defined in claim 1, further comprising a vertical, ceiling mountable cable or support for supporting the weight of the platform when not in use so as to reduce stretching of the cables over time.

13. The apparatus as defined in claim 1, further comprising a power cable connected to said platform, said power cable being arranged above said platform.

14. The apparatus as defined in claim 1, further comprising said wall or ceiling anchor, wherein said wall or ceiling anchor comprises at least three cable group anchorage members attachable to a wall or a ceiling and having cable anchor locations spaced apart to correspond to said vertices of said vertically-arranged polygon.

15. A method of manufacturing a product comprising the steps of:
    providing a cable robot platform apparatus comprising:
        a platform member;
        at least three cable groups, each one of said cable groups having at least three cables and being arranged on one side of said platform member and having at least three cable connection supports spaced apart to form vertices of a vertically-arranged polygon to provide a parallelogram support for the platform member about three axes, wherein in use each cable group can extend between the platform member and a wall or ceiling anchor to provide said platform with gravity stabilized resistance to motion from forces and torques acting on said platform suspended from said cable groups within a predetermined limit; and
        a drive associated with each of said cable groups operable to control a length of said cable groups between said platform member and said anchor, wherein said drive controls a common length for each cable within each one of said at least three cable groups;
    attaching an end effector or tool to said apparatus; and
    performing object handling and/or processing using said end effector or tool to manufacture the product.

16. A cable robot platform apparatus comprising:
a platform member;
at least three wall or ceiling anchors each having at least three cable anchor locations spaced apart to form vertices of a vertically-arranged polygon;
at least three cable groups, each one of said cable groups having at least three cables and being arranged on one side of said platform member and having at least three cable connection supports spaced apart to form vertices of said vertically-arranged polygon to provide a parallelogram support for the platform member about three axes, wherein in use each cable group can extend between the platform member and said wall or ceiling anchors to provide said platform with gravity stabilized resistance to motion from forces and torques acting on said platform suspended from said cable groups within a predetermined limit; and
a drive associated with each of said cable.

* * * * *

UNITED STATES PATENT AND TRADEMARK OFFICE
CERTIFICATE OF CORRECTION

PATENT NO. : 10,471,590 B1
APPLICATION NO. : 16/378734
DATED : November 12, 2019
INVENTOR(S) : Frédéric Vachon Page 1 of 1

It is certified that error appears in the above-identified patent and that said Letters Patent is hereby corrected as shown below:

On the Title Page

Item [71] delete "Frédéric Vachon" and insert --10087530 CANADA INC. D/B/A - RBOT9 AUTOMATION--.

Signed and Sealed this
Seventh Day of December, 2021

Drew Hirshfeld
*Performing the Functions and Duties of the
Under Secretary of Commerce for Intellectual Property and
Director of the United States Patent and Trademark Office*